US012339616B2

(12) United States Patent
Fukamachi et al.

(10) Patent No.: US 12,339,616 B2
(45) Date of Patent: Jun. 24, 2025

(54) IMAGE FORMING APPARATUS INCLUDING DETACHABLE PROCESS CARTRIDGE HAVING HANDLE ON DEVELOPING UNIT

(71) Applicant: BROTHER KOGYO KABUSHIKI KAISHA, Nagoya (JP)

(72) Inventors: Yasuo Fukamachi, Nagoya (JP); Yuki Nagashima, Toyokawa (JP); Junya Sumida, Ama (JP); Sakiho Hayakawa, Toyoake (JP); Marika Ozaki, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/449,338

(22) Filed: Aug. 14, 2023

(65) Prior Publication Data

US 2024/0103429 A1 Mar. 28, 2024

(30) Foreign Application Priority Data

Sep. 28, 2022 (JP) ................................ 2022-154794

(51) Int. Cl.
*G03G 21/18* (2006.01)

(52) U.S. Cl.
CPC ..... *G03G 21/1846* (2013.01); *G03G 21/1814* (2013.01); *G03G 2221/1846* (2013.01)

(58) Field of Classification Search
CPC ........... G03G 21/1846; G03G 21/1814; G03G 2221/1846; G03G 21/1676; G03G 21/1821
See application file for complete search history.

(56) References Cited

U.S. PATENT DOCUMENTS

| | | | | |
|---|---|---|---|---|
| 2002/0131789 A1* | 9/2002 | Yokoi | ................ | G03G 21/1814 399/119 |
| 2011/0064457 A1* | 3/2011 | Okabe | ................ | G03G 21/1821 399/113 |
| 2012/0039624 A1* | 2/2012 | Uchida | ............. | G03G 21/1676 399/119 |
| 2016/0370757 A1* | 12/2016 | Sato | ................... | G03G 21/1821 |
| 2021/0200144 A1* | 7/2021 | Cavill | ................ | G03G 21/1676 |

(Continued)

FOREIGN PATENT DOCUMENTS

| | | |
|---|---|---|
| JP | 2022-32409 A | 2/2022 |
| JP | 2022-32440 A | 2/2022 |

(Continued)

*Primary Examiner* — Sandra Brase
(74) *Attorney, Agent, or Firm* — Merchant & Gould P.C.

(57) ABSTRACT

An image forming apparatus includes a main housing, a movable drawer, and a process cartridge attachable to the drawer. The process cartridge includes a drum unit, and a developing unit. The drum unit includes a drum housing, and a photosensitive drum rotatable about a first axis extending in a first direction. The photosensitive drum is positioned at one end portion of the drum housing at one side in a second direction. The developing unit includes a developing casing, a developing roller, and a developing handle for detaching the process cartridge from the drawer toward another side in the second direction. The developing roller is positioned at one end portion of the developing casing at the one side in the second direction. The developing handle is positioned apart from the drum unit toward the another side in the second direction.

27 Claims, 21 Drawing Sheets

(56) References Cited

U.S. PATENT DOCUMENTS

| | | | |
|---|---|---|---|
| 2022/0050416 A1 | 2/2022 | Kawanami et al. | |
| 2022/0066383 A1* | 3/2022 | Sato | G03G 21/1814 |
| 2022/0082995 A1 | 3/2022 | Kaisha | |

FOREIGN PATENT DOCUMENTS

| | | |
|---|---|---|
| JP | 2022-32445 A | 2/2022 |
| JP | 2022-49295 A | 3/2022 |
| JP | 2022-49296 A | 3/2022 |
| JP | 2022-50262 A | 3/2022 |
| JP | 2022-50263 A | 3/2022 |
| JP | 2022-50266 A | 3/2022 |
| JP | 2022-50270 A | 3/2022 |
| JP | 2022-50358 A | 3/2022 |

* cited by examiner

IMAGE FORMING APPARATUS INCLUDING DETACHABLE PROCESS CARTRIDGE HAVING HANDLE ON DEVELOPING UNIT

REFERENCE TO RELATED APPLICATIONS

This application claims priority from Japanese Patent Application No. 2022-154794 filed on Sep. 28, 2022. The entire content of the priority application is incorporated herein by reference.

BACKGROUND ART

As a conventional image forming apparatus, there has been known an image forming apparatus including a main housing, a drawer movable relative to the main housing, and a process cartridge detachably attachable to the drawer. According to this conventional image forming apparatus, the process cartridge includes a developing unit including a developing roller, and a drum unit including a photosensitive drum. The developing unit is pivotally movably supported by the drum unit. The process cartridge further includes a separation/contact mechanism configured to move the developing roller and the photosensitive drum to make contact with and to be separated from each other.

This separation/contact mechanism is configured to hold the process cartridge in a separated state, as a basic state, where the developing roller is separated away from the photosensitive drum. Upon receipt of an external force from the main housing during an attachment of the process cartridge to the main housing through the drawer, the separation/contact mechanism causes the process cartridge to be shifted temporarily to a contacting state where the developing roller is in contact with the photosensitive drum. Image formation on a sheet can be performed while the process cartridge is in the contacting state. In this way, the developing roller is configured to contact the photosensitive drum only during image formation, while the developing roller is maintained to be separated from the photosensitive drum while image formation is not performed.

DESCRIPTION

Here, no handle is provided in the above-described conventional process cartridge according to which the developing roller is separated from the photosensitive drum as its basic state and the developing roller is allowed to contact the photosensitive drum temporarily only when image formation is performed. Without a handle, a user may find it difficult to visually recognize how to hold the process cartridge at the time of attachment and detachment of the process cartridge to and from the drawer. As such, the user may encounter difficulty in holding the process cartridge.

In view of the foregoing, it is an object of the present disclosure to provide a process cartridge that enables a user to visually recognize which portion of the process cartridge should be held for facilitating the user's holding of the process cartridge, under an assumption that the process cartridge is basically in the separated state but shifts to the contacting state only during image formation.

In order to attain the above and other object, according to one aspect, the present disclosure provides an image forming apparatus including a main housing, a drawer, and a process cartridge. The drawer is movable relative to the main housing. The process cartridge is attachable to the drawer. The process cartridge is in a basic state without application of an external force thereto, and is configured to temporarily shift from the basic state to a contacting state upon receipt of the external force. The process cartridge includes a drum unit, and a developing unit. The drum unit includes a drum housing, and a photosensitive drum rotatable about a first axis extending in a first direction. The photosensitive drum is positioned at one end portion of the drum housing at one side in a second direction. The developing unit includes a developing casing, a developing roller, and a developing handle. The developing casing defines a toner accommodating chamber therein for accommodating toner. The developing casing includes a convex portion positioned farther away from the drawer toward another side in the second direction than the drum unit is from the drawer toward the another side in the second direction in a state where the process cartridge is attached to the drawer. The developing roller is rotatable about a second axis extending in the first direction. The developing roller is positioned at one end portion of the developing casing at the one side in the second direction. The developing roller is separated from the photosensitive drum while the process cartridge is in the basic state. The developing roller is in contact with the photosensitive drum while the process cartridge is in the contacting state. The developing handle is for detaching the process cartridge in the basic state from the drawer toward the another side in the second direction. The developing handle is positioned apart from the drum unit toward the another side in the second direction.

With this structure, since the process cartridge has the developing handle, a user can easily recognize which part of the process cartridge the user should grab for attachment and detachment of the process cartridge to and from the drawer. Accordingly, the user can hold the process cartridge easily.

Figure 1:
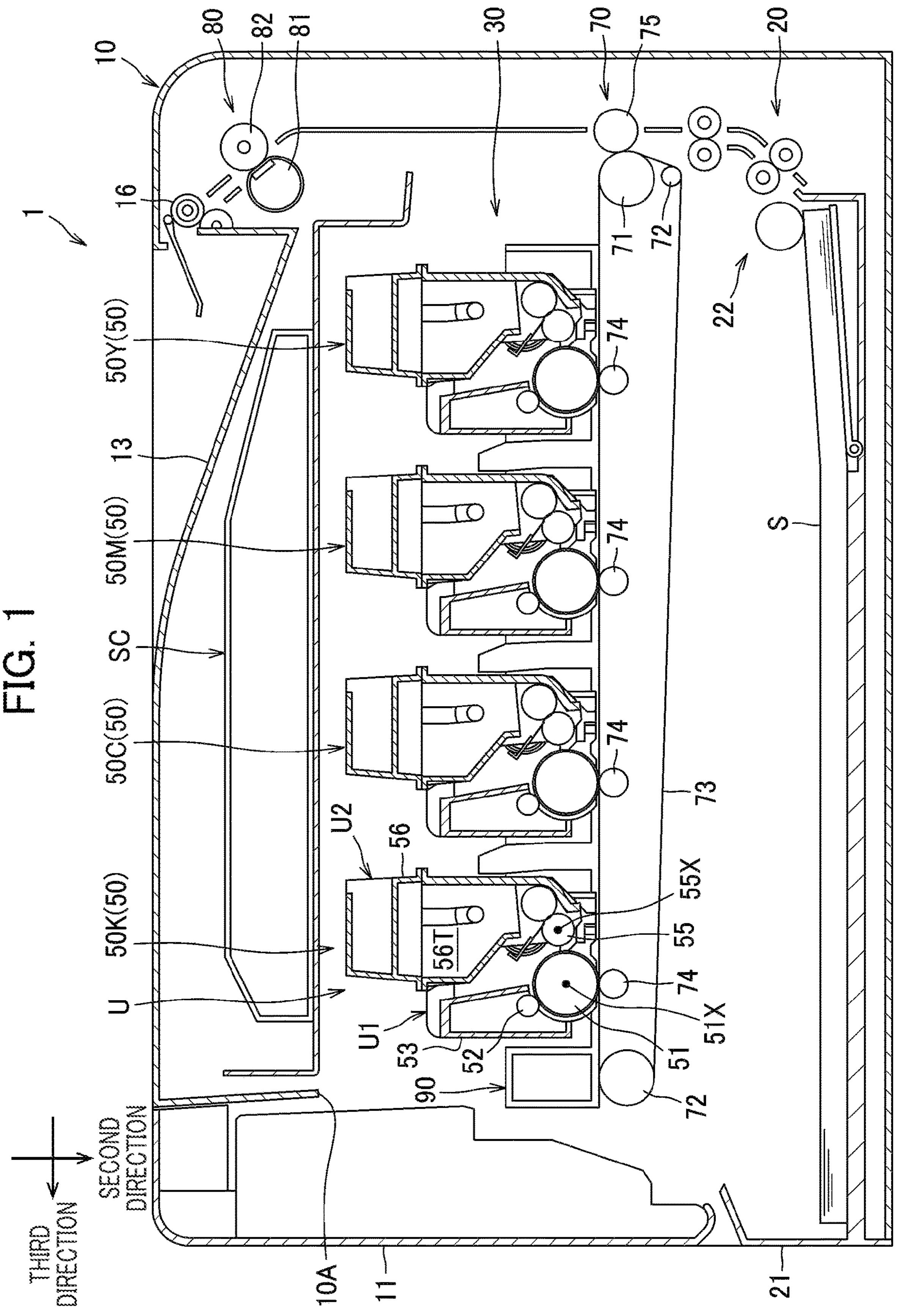
FIG. 1 is a schematic cross-sectional view of an image forming apparatus according to a first embodiment of the disclosure.

Hereinafter, embodiments of the disclosure will be described with reference to accompanying drawings.

Throughout the description, directions (first, second and third directions) will be referred to based on those indicated in FIG. 3. Specifically, in the present disclosure, the second direction is orthogonal to the first direction, and the third direction is orthogonal to both the first and second directions.

Further, each arrow in the drawings indicates one side in the corresponding direction. In the following description, "one end" or "one end portion" implies a component at the one side in the corresponding direction (at a leading side of the arrow), and "another end" or "another end portion" implies a component at another side in the corresponding direction (at a trailing side of the arrow).

Incidentally, the second direction may be any direction as long as the second direction crosses the first direction, and the third direction may be any direction as long as the third direction crosses both the first and second directions.

First Embodiment

An image forming apparatus 1 according to a first embodiment will be described with reference to FIGS. 1 through 5C.

The image forming apparatus 1 according to the first embodiment is a color printer. As illustrated in FIG. 1, the image forming apparatus 1 includes a main housing 10, a housing cover 11, a sheet supply unit 20, and an image forming unit 30.

As illustrated in FIG. 1, the main housing 10 has an opening 10A. The opening 10A is at one end portion of the main housing 10 at one side in the third direction. Through this opening 10A, a drawer 90 (described later) is configured to be withdrawn from the main housing 10. The housing cover 11 is configured to open and close the opening 10A. Specifically, the housing cover 11 is movable between a closed position (see FIG. 1) where the housing cover 11 closes the opening 10A and an open position (see FIG. 2) where the housing cover 11 opens the opening 10A.

The sheet supply unit 20 is positioned inside the main housing 10. The sheet supply unit 20 includes a sheet tray 21, and a sheet supply mechanism 22. The sheet tray 21 is configured to store a sheet S. The sheet supply mechanism 22 is configured to supply the sheet S from the sheet tray 21 to the image forming unit 30.

The image forming unit 30 includes a scanner SC, a process unit U, a transfer unit 70, and a fixing unit 80. The scanner SC is configured to expose a plurality of photosensitive drums 51 (described later) to light. The scanner SC includes a laser diode, a deflector, a lens, and a mirror, all of which are not illustrated.

The process unit U includes a plurality of process cartridges 50 and the drawer 90. In the present embodiment, the process unit U includes four process cartridges 50 and the drawer 90.

Each process cartridge 50 includes a drum unit U1 and a developing unit U2. The drum unit U1 includes one of the photosensitive drums 51, a charging roller 52, and a drum housing 53.

The photosensitive drum 51 is rotatable about a drum axis 51X extending in the first direction. The charging roller 52 is positioned to face the photosensitive drum 51. The drum housing 53 accommodates a part of the charging roller 52 therein. The photosensitive drum 51 is positioned at one end portion of the drum housing 53 at one side in the second direction.

The developing unit U2 includes a developing roller 55 and a developing casing 56. The developing roller 55 is rotatable about a second axis 55X extending in the first direction. The developing roller 55 is positioned to face the photosensitive drum 51. The developing casing 56 defines therein a toner accommodating chamber 56T configured to accommodate toner therein. The developing roller 55 is positioned at one end portion of the developing casing 56 at the one side in the second direction.

The four process cartridges 50 respectively store toner of different colors, namely, yellow, magenta, cyan, and black.

Specifically, the four process cartridges 50 include a yellow process cartridge 50Y, a magenta process cartridge 50M, a cyan process cartridge 50C, and a black process cartridge 50K which are arrayed in this order in the third direction toward one side from another side. Incidentally, in the disclosure, characters Y, M, C, K will be added in order to specify parts or components associated with the respective colors of toner.

The drawer 90 is movable in the third direction, relative to the main housing 10, through the opening 10A. Specifically, the drawer 90 is movable between an inner position (depicted in FIG. 1) where the drawer 90 is attached to the main housing 10 and an outer position (depicted in FIG. 2) where the drawer 90 is withdrawn out of the main housing 10. The drawer 90 is configured to be withdrawn toward the one side in the third direction from the main housing 10.

The drawer 90 is configured to receive the four process cartridges 50 thereon. The four process cartridges 50 are arrayed with one another in the third direction in a state where the four process cartridges 50 are attached to the drawer 90. The drawer 90 is attachable to the main housing 10 with the four process cartridges 50 attached to the drawer 90.

The transfer unit 70 includes a drive roller 71, a follower roller 72, an intermediate transfer belt 73, four primary transfer rollers 74, and a secondary transfer roller 75. The intermediate transfer belt 73 is an endless belt. The drive roller 71 and the follower roller 72 are configured to circularly move the intermediate transfer belt 73. Each primary transfer roller 74 and the corresponding photosensitive drum 51 nip the intermediate transfer belt 73 therebetween. The secondary transfer roller 75 and the drive roller 71 nip the intermediate transfer belt 73 therebetween.

The fixing unit 80 is configured to fix a toner image to the sheet S. The fixing unit 80 includes a heat roller 81 and a pressure roller 82. The heat roller 81 has an inner space where a heater is provided. The pressure roller 82 is positioned to face the heat roller 81. The pressure roller 82 and the heat roller 81 define a nipping portion therebetween.

In the image forming unit 30, a peripheral surface of each photosensitive drum 51 is exposed to light by the scanner SC after being charged by the corresponding charging roller 52, thereby forming an electrostatic latent image on the peripheral surface of each photosensitive drum 51. Then, each developing roller 55 supplies toner of the corresponding color in the process cartridge 50 to the electrostatic latent image formed on the corresponding photosensitive drum 51, forming a toner image on each photosensitive drum 51.

Thereafter, the toner image on each photosensitive drum 51 is transferred to the intermediate transfer belt 73 by the corresponding primary transfer roller 74. The toner image on the intermediate transfer belt 73 is then transferred to the sheet S while the sheet S passes through a position between the drive roller 71 and the secondary transfer roller 75. The sheet S carrying the toner image is then thermally fixed to the sheet S while the sheet S passes through the nipping portion between the heat roller 81 and the pressure roller 82.

The sheet S having moved past the fixing unit 80 is finally discharged onto a discharge tray 13 which is formed on an upper surface of the main housing 10 by a discharge roller 16 positioned near an exit of the main housing 10 to the discharge tray 13.

Figure 3A:
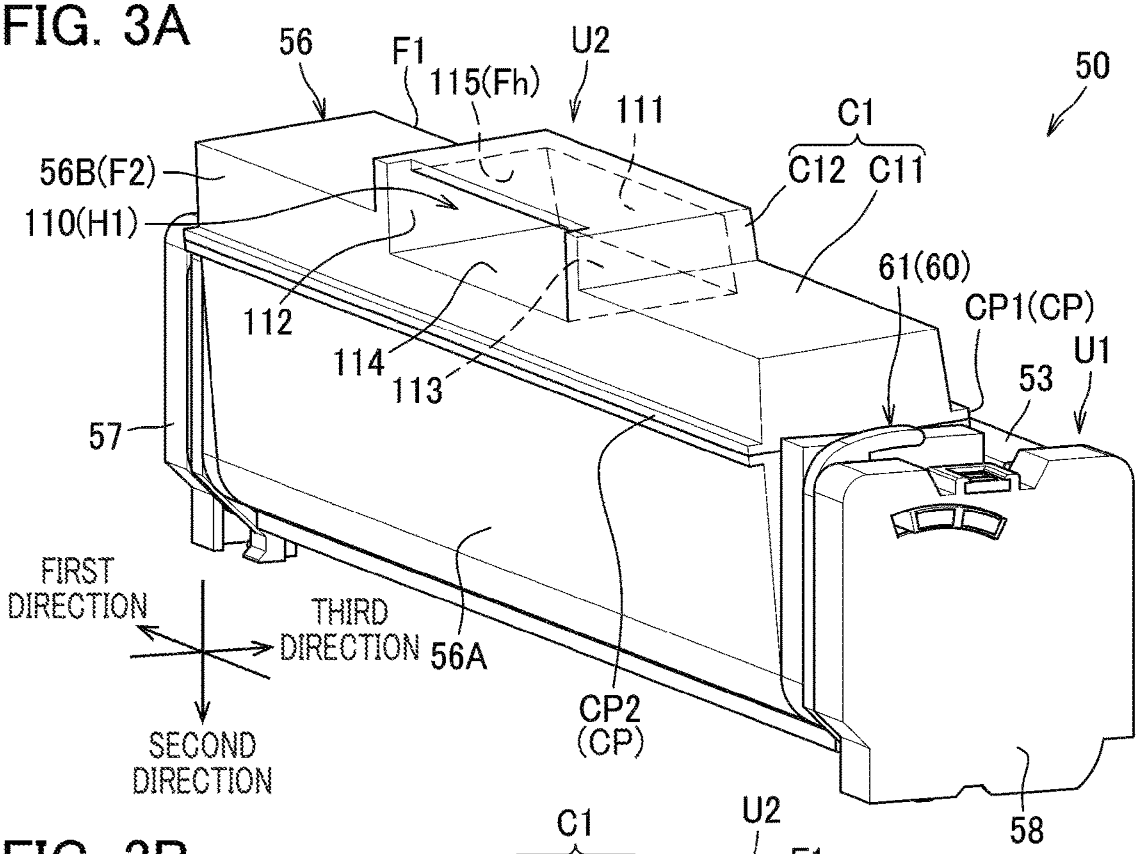
FIG. 3A is a perspective view of a process cartridge according to the first embodiment as viewed from another side in a third direction.
Figure 3B:
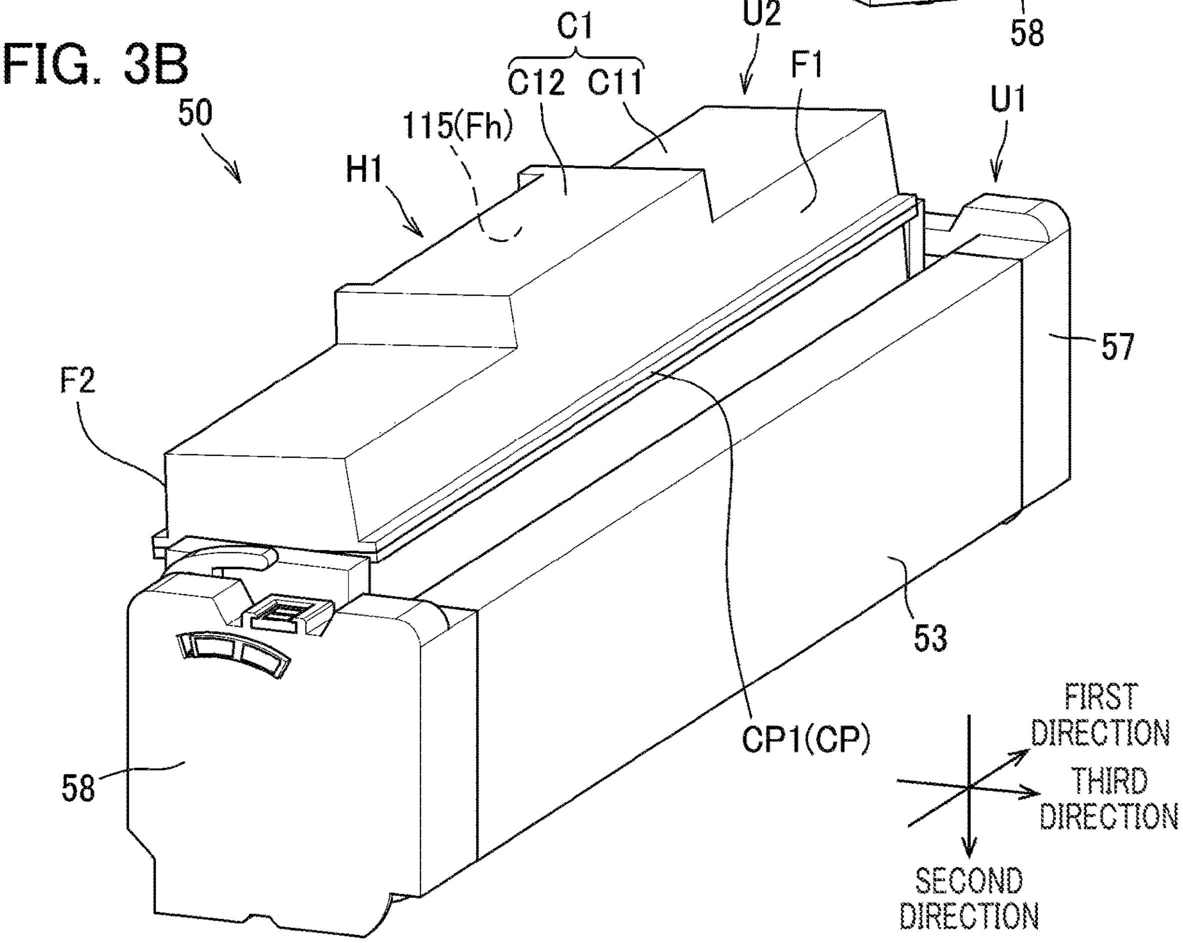
FIG. 3B is a perspective view of the process cartridge according to the first embodiment as viewed from one side in the third direction.

As illustrated in FIGS. 3A and 3B, the drum unit U1 further includes a first side cover 57 and a second side cover 58. The first side cover 57 is positioned at one end of the drum housing 53 at one side in the first direction. The second side cover 58 is positioned at another end of the drum housing 53 at another side in the first direction.

The first side cover 57 and the second side cover 58 are fixed to the drum housing 53. Each of the first side cover 57 and the second side cover 58 has a portion that protrudes further toward another side in the third direction than the other end of the drum housing 53 in the third direction.

The drum housing 53 has a plate like portion positioned on the one side of the developing casing 56 in the third direction. The developing unit U2 is positioned between the first side cover 57 and the second side cover 58 in the first direction. The first side cover 57 and the second side cover 58 are configured to pivotally movably support the developing unit U2.

Figure 5A:
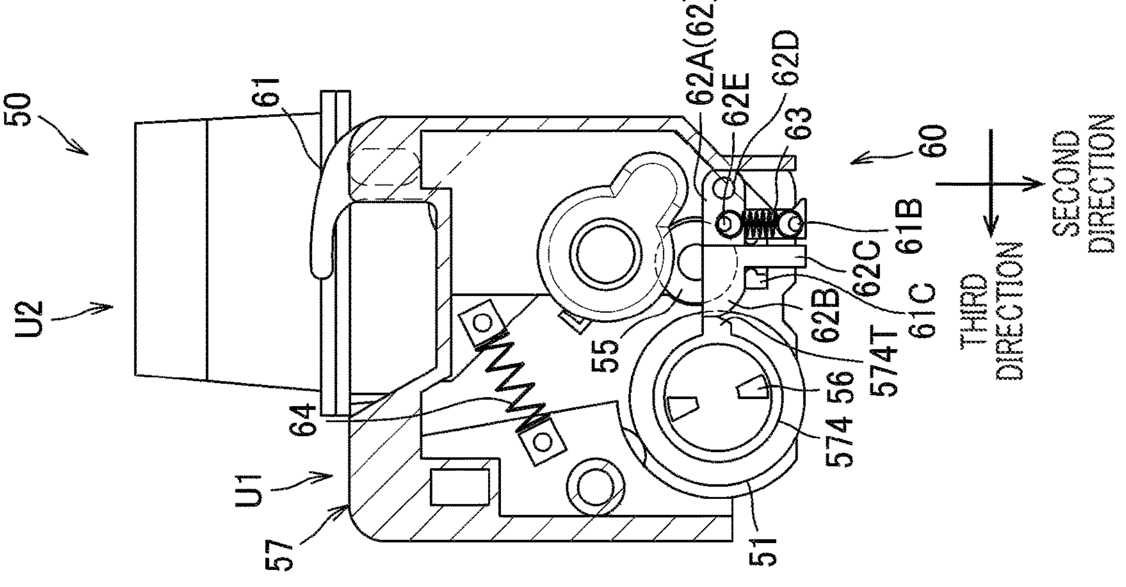
FIG. 5A is a view illustrating the separation mechanism in a state where a lever is at a first lever position.
Figure 5B:
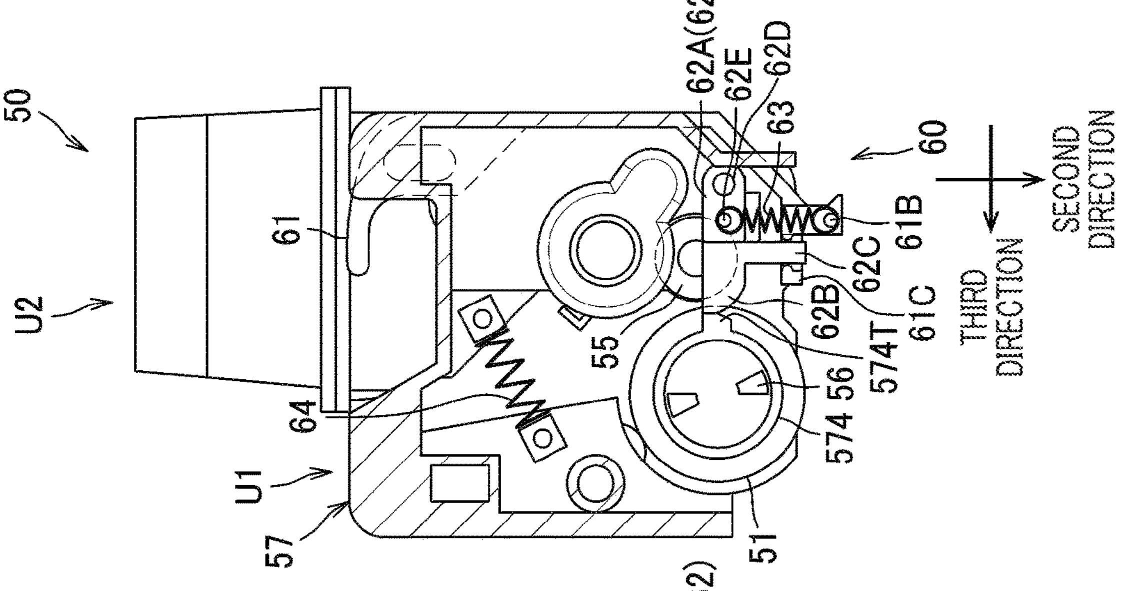
FIG. 5B is a view illustrating the separation mechanism in a state where the lever is at a second lever position.
Figure 5C:
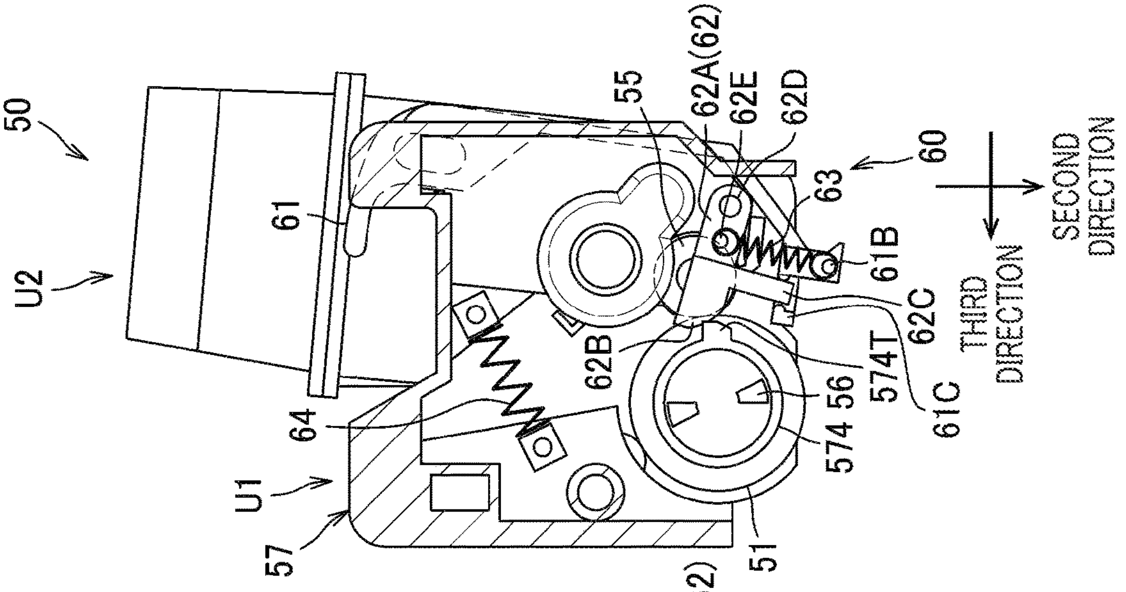
FIG. 5C is a view illustrating the separation mechanism in a state where the lever is at a third lever position.

In accordance with the pivotal movement of the developing unit U2 relative to the drum unit U1, the developing roller 55 is movable between a separated position (illustrated in FIGS. 5A and 5B) and a contacting position (illustrated in FIG. 5C). The developing roller 55 is separated from the photosensitive drum 51 when the developing roller 55 is at the separated position. The developing roller 55 contacts the photosensitive drum 51 when the developing roller 55 is at the contacting position.

Upon receipt of an external force, the process cartridge 50 is configured to be temporarily switched from a basic state where the photosensitive drum 51 and the developing roller 55 are separated from each other to a contacting state where the photosensitive drum 51 and the developing roller 55 are in contact with each other.

As a mechanism for realize switching between the basic state and the contacting state, the process cartridge 50 further includes a separation mechanism 60 as illustrated in FIGS. 3A through 5C. The separation mechanism 60 is positioned at each end of the developing unit U2 in the first direction. Incidentally, a structure of the separation mechanism 50 and in the vicinity thereof is the same at each end of the developing unit U2 in the first direction (both at the one side and the other side in the first direction). As such, hereinafter, the structure of the separation mechanism 60 at the one side in the first direction will only be described as a matter of convenience.

Figure 4:
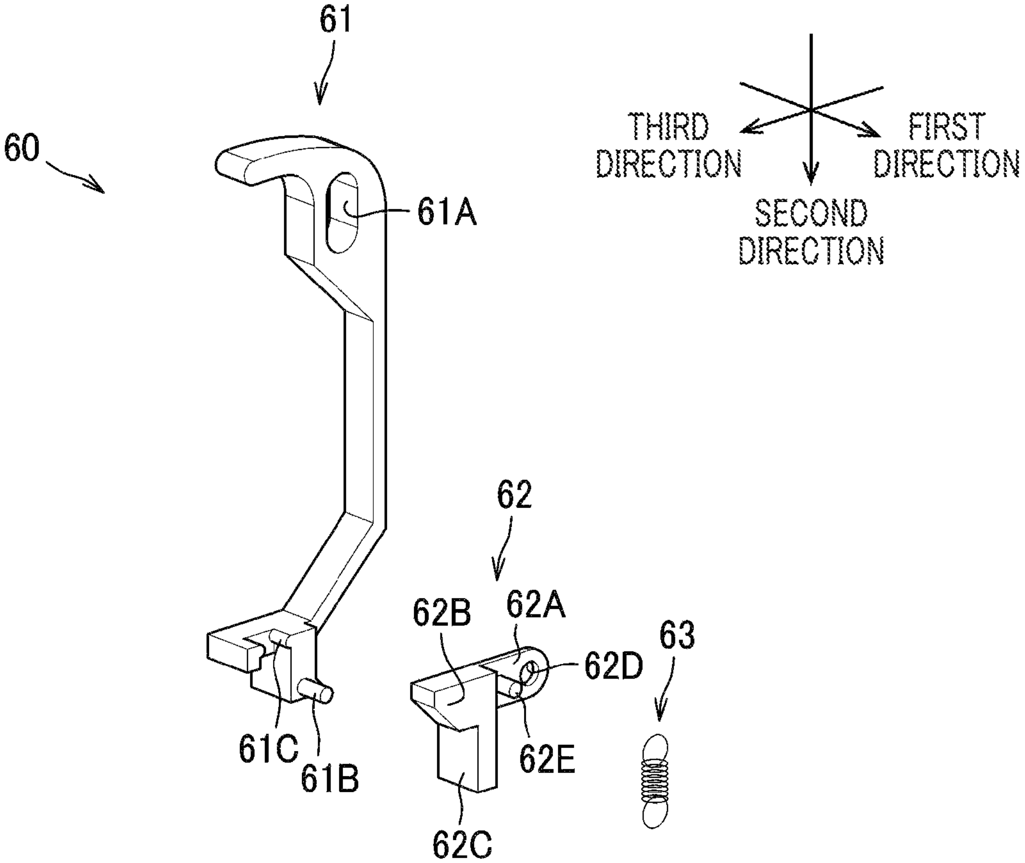
FIG. 4 is an exploded perspective view illustrating a separation mechanism in the process cartridge according to the first embodiment.

As illustrated in FIG. 4, the separation mechanism 60 includes a lever 61, a locking member 62, and a tension coil spring 63. Incidentally, the developing roller 55 is urged toward the photosensitive drum 51 by an urging force of a compression coil spring 64 illustrated in FIGS. 5A through 5C. The compression coil spring 64 is positioned between the drum unit U1 and the developing unit U2.

The lever 61 is configured to move the developing roller 55 between the separated position and the contacting position. The lever 61 has an elongated shape extending in the second direction. The lever 61 has an elongated hole 61A, a recess 61C, and a protrusion 61B.

The elongated hole 61A is elongated in the second direction. The protrusion 61B and the recess 61C are positioned at one end portion of the lever 61 in the second direction, whereas the elongated hole 61A is positioned at another end portion of the lever 61 in the second direction.

The elongated hole 61A receives therein a first protrusion (not illustrated). The first protrusion supports the lever 61 such that the lever 61 is movable in the second direction as well as the lever 61 is pivotally movable. Incidentally, the first protrusion may be provided in any one of the members constituting the developing unit U2.

The lever 61 is movable in the second direction between a first lever position illustrated in FIG. 5A and a second lever position illustrated in FIG. 5B. The lever 61 is also pivotally movable between the second lever position illustrated in FIG. 5B and a third lever position illustrated in FIG. 5C.

The locking member 62 is configured to lock the developing roller 55 at the separated position. As illustrated in FIG. 4, the locking member 62 includes a first part 62A, a second part 62B, and a third part 62C.

The first part 62A has a hole 62D and a protrusion 62E. The hole 62D receives therein a second protrusion (not illustrated). The second protrusion pivotally movably supports the locking member 62. Incidentally, the second protrusion may be provided in any one of the members constituting the developing unit U2.

The locking member 62 is pivotally movable relative to the drum unit U1 between a locking position illustrated in FIGS. 5A and 5B and an unlocking position illustrated in FIG. 5C. The locking member 62 is restricted from pivoting counterclockwise in FIGS. 5A and 5B from the locking position, so as not to move from the locking position in a direction opposite a pivoting direction thereof toward the unlocking position.

The tension coil spring 63 has one end portion hooked to the protrusion 61B of the lever 61, and another end portion hooked to the protrusion 62E of the locking member 62.

The second part 62B is positioned opposite the hole 62D with respect to the protrusion 62E. When the locking member 62 is at the locking position, a tip end of the second part 62B is engaged with a protrusion 574T of the first side cover 57. When the locking member 62 is at the unlocking position, the tip end of the second part 62B is disengaged from the protrusion 574T of the first side cover 57.

As illustrated in FIG. 4, the third part 62C extends from a boundary between the first part 62A and the second part 62B. As illustrated in FIGS. 5A to 5C, the third part 62C is received in the recess 61C of the lever 61. As illustrated in FIG. 5A, when the locking member 62 is at the locking position, the first part 62A and the second part 62B extend in the third direction, and the third part 62C extends in the second direction toward the one side, i.e., in a direction away from the protrusion 62E of the first part 62A.

FIG. 5A illustrate a state of the process cartridge 50 that is detached from the main housing 10 of the image forming apparatus 1. As illustrated in FIG. 5A, in a state where the process cartridge 50 is detached from the main housing 10, the lever 61 is at the first lever position, the locking member 62 is at the locking position, and the developing roller 55 is at the separated position. When the lever 61 is at the first lever position, a part of the lever 61 protrudes further toward the other side in the second direction (further upward in FIG. 5A) than another end of the first side cover 57 in the second direction (upper end of the first side cover 57 in FIG. 5A).

FIG. 5B illustrates a state of the process cartridge 50 that is attached to the main housing 10 through the drawer 90 and that is not involved in a printing operation. In other words, FIG. 5B illustrates the state of the process cartridge 50 just after the drawer 90 having the process cartridge 50 attached thereto is moved to an inside of the main housing 10 (inner position) from an outside thereof (outer position). As the drawer 90 moves from the outside (outer position) to the inner position (inside of the main housing 10), another end portion of the lever 61 in the second direction (upper end in FIG. 5B) is brought into abutment with a part of the main housing 10 (a lever pressing part of the main housing 10), thereby moving the lever 61 from the first lever position to the second lever position against an urging force of the tension coil spring 63. When the drawer 90 is at the inner position, the lever pressing part maintains the lever 61 at the second lever position.

As illustrated in FIG. 5B, in a state where the process cartridge 50 is attached to the main housing 10 and printing is not performed, the lever 61 is at the second lever position, the locking member 62 is at the locking position, and the developing roller 55 is at the separated position.

As illustrated in FIG. 5B, when the lever 61 is at the second lever position, a part of the lever 61 protrudes further toward the one side in the second direction (downward in FIG. 5B) than one end of the first side cover 57 in the second direction. Specifically, one end portion of the lever 61 in the second direction (lower end of the lever 61) protrudes from the first side cover 57 toward the one side in the second direction by a protruding amount that is greater when the lever 61 is at the second lever position (depicted in FIG. 5B) than when the lever 61 is at the first lever position (illustrated in FIG. 5A). As illustrated in FIG. 5B, the tension coil spring 63 is in a more stretched state when the lever 61 is at the second lever position than when the lever 61 is at the first lever position.

FIG. 5C illustrates a state of the process cartridge 50 that is attached to the main housing 10 and that is involved in printing. The image forming apparatus 1 includes a pressing member (not illustrated) that is configured to press the one end portion in the second direction of the lever 61 (i.e., the lower end of the lever 61 protruding from the first side cover 57 in the second direction) toward the one side and the other side in the third direction.

Upon receipt of a print command by a controller of the image forming apparatus 1, the controller activates the pressing member to push the one end portion in the second direction of the lever 61 (protruding lower end of the lever 61 from the first side cover 57) toward the one side in the third direction (leftward in FIG. 5B). As a result, the lever 61 pivotally moves, relative to the drum unit U2, from the second lever position (FIG. 5B) to the third lever position (FIG. 5C).

In response to the movement of the lever 61 from the second lever position to the third lever position, the recess 61C of the lever 61 presses the third part 62C of the locking member 62 toward the one side in the third direction (leftward in FIG. 5C). Accordingly, the locking member 62 pivotally moves from the locking position to the unlocking position to disengage the tip end of the locking member 62 (the second part 62B) from the protrusion 574T of the first side cover 57.

Upon disengagement of the tip end of the locking member 62 (the second part 62B) from the protrusion 574T, the developing unit U2 pivotally moves in a clockwise direction in FIG. 5C by the urging force of the compression coil spring 64. In other words, the developing unit U2 pivotally moves in such a direction that another end in the second direction of the developing unit U2 separates away from one end of the drum unit U1 in the third direction. As a result, the developing roller 55 moves from the separated position to the contacting position. In other words, the developing roller 55 comes into contact with the photosensitive drum 51.

For separating the development roller 55 from the photosensitive drum 51, the controller activates the pressing member to push the end portion in the second direction of the lever 61 toward the other side in the third direction (rightward in FIG. 5C). As a result, the lever 61 pivotally moves, relative to the drum unit U1, from the third lever position to the second lever position illustrated in FIG. 5B.

In response to the movement of the lever 61 from the third lever position to the second lever position, the recess 61C of the lever 61 presses the third part 62C of the locking member 62 toward the other side in the third direction (rightward in FIG. 5C), while the lever 61 pulls the locking member 62 toward the locking position through the tension coil spring 63. As a result, the locking member 62 pivotally moves from the unlocking position to the locking position to engage the tip end of the locking member 62 (the second part 62B) with the protrusion 574T of the first side cover 57.

While the locking member 62 pivotally moves from the unlocking position to the locking position, the locking member 62 pushes the one end portion in the second direction of the developing unit U2 toward the other side in the third direction. As a result, the developing unit U2 pivotally moves counterclockwise in FIG. 5C against the urging force of the compression coil spring 64. In other words, the developing unit U2 pivotally moves in such a direction that the other end in the second direction of the developing unit U2 approaches the one end of the drum unit U1 in the third direction. Accordingly, the developing roller 55 moves from the contacting position to the separated position.

In accordance with the movement of the drawer 90 from the inside (inner position) to the outside of the main housing 10 (outer position), the lever 61 is separated from the lever pressing part of the main housing 10, thereby moving from the second lever position to the first lever position by the urging force of the tension coil spring 63.

Incidentally, the movement of the lever 61 between the first lever position and the second lever position may be performed by moving the lever pressing part. Specifically, the lever pressing part may be configured to move relative to the main housing 10, and the controller may allow the lever pressing part to move toward the lever 61 when the drawer 90 is attached to the main housing 10 so that the lever pressing part moves the lever 61 from the first lever position to the second lever position against the urging force of the tension coil spring 63. Further, the controller may allow the lever pressing part to move away from the lever 61 when the drawer 90 is drawn out of the main housing 10, so that the lever 61 moves from the second lever position to the first lever position by the urging force of the tension coil spring 63.

As illustrated in FIGS. 3A and 3B, the developing casing 56 includes a first developing casing 56A and a second developing casing 56B. The first developing casing 56A supports the developing roller 55. The second developing casing 56B is positioned at another end of the first developing casing 56A in the second direction. The second developing casing 56B is joined to the first developing casing 56A to provide a joining portion CP therebetween.

Figure 2:
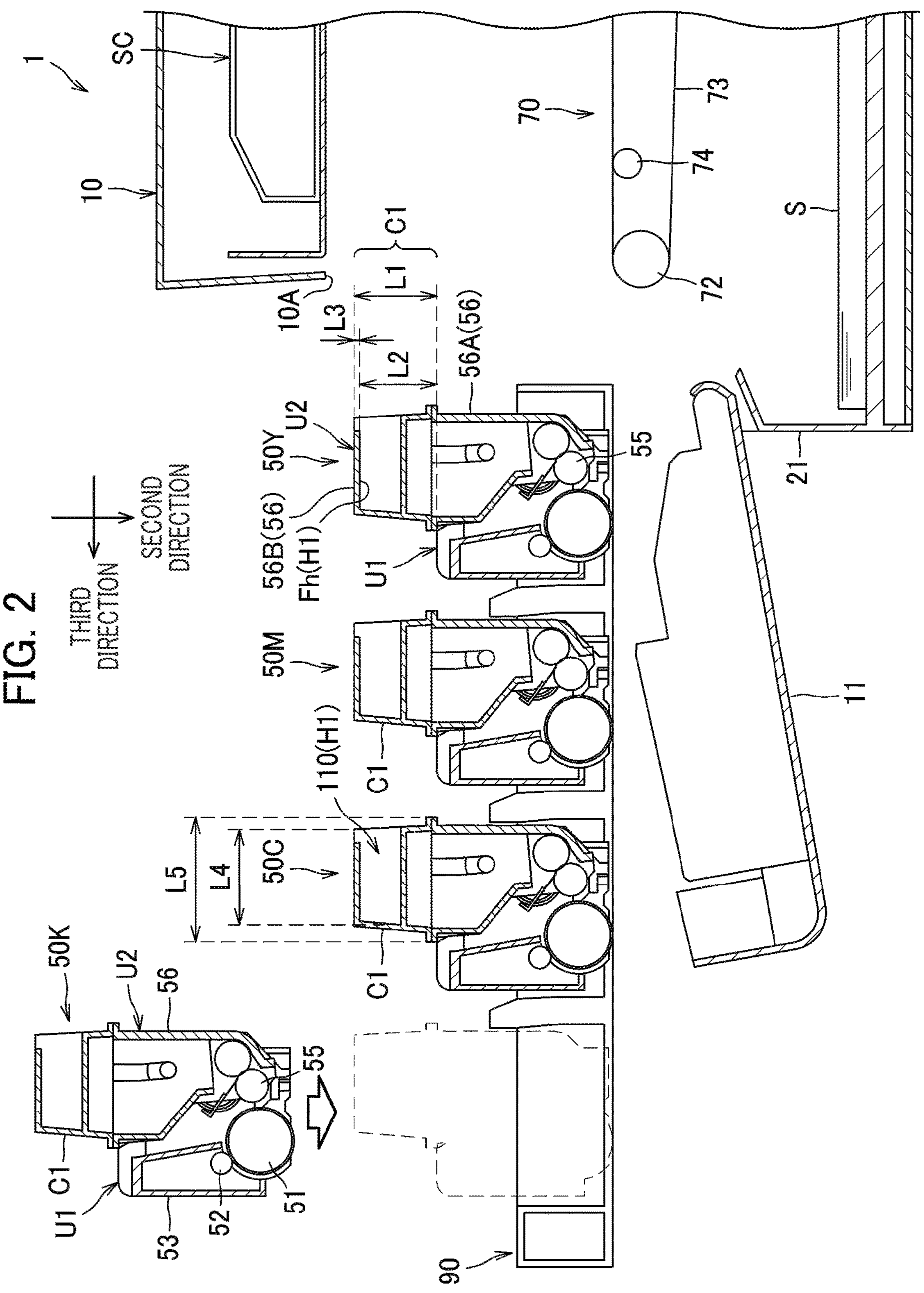
FIG. 2 is view illustrating a state where a drawer is withdrawn from a main housing of the image forming apparatus according to the first embodiment.

As illustrated in FIG. 2, the developing casing 56 includes a convex portion C1. The convex portion C1 is a portion that protrudes further toward the other side in the second direction relative to the drum unit U1 when the process cartridge 50 is in the basic state.

Specifically, the convex portion C1 has a length L1 in the second direction, as illustrated in FIG. 2. In the present embodiment, an entirety of the second developing casing 56B and a part of the first developing casing 56A constitute the convex portion C1. The convex portion C1 is positioned farther away from the drawer 90 than the drum unit U1 is from the drawer 90 in the second direction.

As illustrated in FIGS. 3A and 3B, the convex portion C1 includes a first part C11 and a second part C12. The second part C12 protrudes toward the other side in the second direction from a center portion of another end of the first part C11 in the first direction.

The convex portion C1 has a first surface F1 and a second surface F2 opposite each other in the third direction. The first surface F1 is one end surface of the convex portion C1 in the third direction. The second surface F2 is another end surface of the convex portion C1 in the third direction.

The joining portion CP between the first developing casing 56A and the second developing casing 56B is configured of a first joining portion CP1 and a second joining portion CP2. The first joining portion CP1 protrudes in the third direction toward the one side from the first surface F1. The second joining portion CP2 protrudes in the third direction toward the other side from the second surface F2.

The developing unit U2 further includes a developing handle H1. The developing handle H1 is adapted to be gripped by a user for detaching the process cartridge 50 in the basic state from the drawer 90 in the second direction toward the other side. The developing handle H1 has a recessed portion 110.

In other words, the developing handle H1 is a part of the developing casing 56 including the recessed portion 110. The developing handle H1 is positioned on the other side of the drum unit U1 in the second direction. That is, the developing handle H1 is positioned at the convex portion C1. Specifically, the developing handle H1 is positioned to span across the first part C11 and the second part C12.

The recessed portion 110 is recessed in the third direction toward the one side from the second surface F2. That is, the recessed portion 110 is open at the second surface F2. The recessed portion 110 has a first inner surface 111, a second inner surface 112, a third inner surface 113, a fourth inner surface 114, and a fifth inner surface 115.

The first inner surface 111 is an end surface of the recessed portion 110 at the one side in the third direction. The first inner surface 111 faces the opening of the recessed portion 110 in the third direction. The second inner surface 112 extends toward the other side in the third direction from one end of the first inner surface 111 in the first direction, and is connected to the second surface F2.

The third inner surface 113 faces the second inner surface 112. The third inner surface 113 extends toward the other side in the third direction from another end of the first inner surface 111 in the first direction, and is connected to the second surface F2. The fourth inner surface 114 extends in the third direction toward the other side from one end of the first inner surface 111 in the second direction, and is connected to the second surface F2. That is, the fourth inner surface 114 is connected to the first inner surface 111, the second inner surface 112, and the third inner surface 113.

The fifth inner surface 115 faces the fourth inner surface 114 in the second direction. The fifth inner surface 115 extends in the third direction toward the other side from another end of the first inner surface 111 in the second direction. The fifth inner surface 115 is spaced apart from the second surface F2 in the third direction. With this arrangement of the fifth inner surface 115, a part of the recessed portion 110 is open toward the other side in the second direction. Specifically, in a peripheral portion of the recessed portion 110 defining the opening of the recessed portion 110, a portion thereof at the other side in the second direction (upper end portion in FIG. 3A) is recessed (dented) in the third direction toward the one side to provide an opening that is open toward the other side in the second direction in the recessed portion 110.

Among the first through fifth inner surfaces 111-115 of the recessed portion 110, the fifth inner surface 115 constitutes an inner surface of the recessed portion 110 at the other side in the second direction. The fifth inner surface 115 functions as an operation surface Fh with which user's fingers are hooked from the one side in the second direction (from below in the basic state) for holding the process cartridge 50.

The operation surface Fh crosses the second direction. Specifically, the operation surface Fh is perpendicular to the second direction. The operation surface Fh faces toward the one side in the second direction (downward in FIGS. 3A and 3B). Here, "the operation surface Fh faces toward the one side in the second direction" implies that a normal vector of the operation surface Fh (and specifically the normal vector directing outward from the operation surface Fh) contains a component directing toward the one side in the second direction. Accordingly, the normal line of the operation surface Fh may be inclined relative to the second direction.

Further, the recessed portion 110 has an inner space on the one side of the operation surface Fh in the second direction (i.e., below the operation surface Fh in FIG. 3A), so that the user's fingers can be inserted in the inner space for hooking the fingers with the operation surface Fh.

As illustrated in FIG. 2, the recessed portion 110 has a length L4 in the third direction that is greater than one half of a length L5 in the third direction of the convex portion C1. Incidentally, the length L4 may be equal to or greater than one third of the length L5, or may be equal to or greater than two thirds of the length L5.

Further, referring to FIG. 2, a distance L2 in the second direction between the operation surface Fh and the other end in the second direction of the drum unit U1 is greater than a distance L3 in the second direction between the operation surface Fh and an end of the convex portion C1 at the other side in the second direction.

According to the above-described configuration of the first embodiment, the following technical advantages can be obtained.

Since the developing unit U2 includes the developing handle H1, the user can easily recognize which portion should be held in order to detach and attach the process cartridge 50 relative to the drawer 90. Accordingly, the user can easily hold the process cartridge 50.

The developing handle H1 has the operation surface Fh facing in the second direction toward the one side. This configuration can facilitate detachment of the process cartridge 50 from the drawer 90.

The length L4 in the third direction of the recessed portion 110 (from the one end to the other end of the recessed portion 110) is equal to or greater than one half of the length L5 in the third direction of the convex portion C1, as depicted in FIG. 2. With this structure, since the operation surface Fh can be enlarged, detachment of the process cartridge 50 from the drawer 90 can be easily performed.

Further, since the recessed portion 110 has a portion that is open in the second direction toward the other side, the user can easily insert his fingers into the recessed portion 110. Particularly, since the recessed portion 110 is also open in the third direction toward the other side, insertion of the user's fingers into the recessed portion 110 can be promoted.

Second Embodiment

Next, a process cartridge 250 according to a second embodiment will be described with reference to FIGS. 6A and 6B, wherein like parts and components are designated by the same reference numerals as those of the first embodiment illustrated in FIGS. 1 through 5C to avoid duplicating description.

Figure 6A:
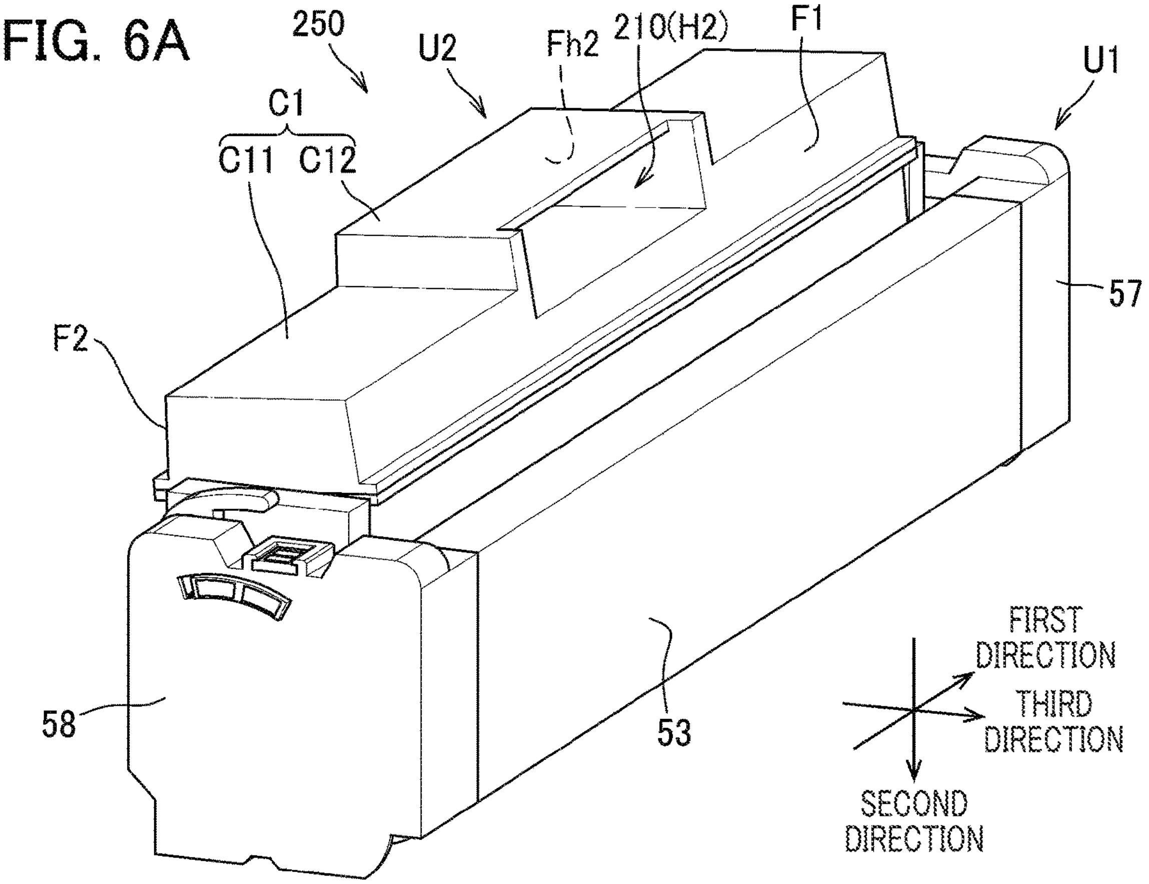
FIG. 6A is a perspective view of a process cartridge according to a second embodiment of the disclosure.
Figure 6B:
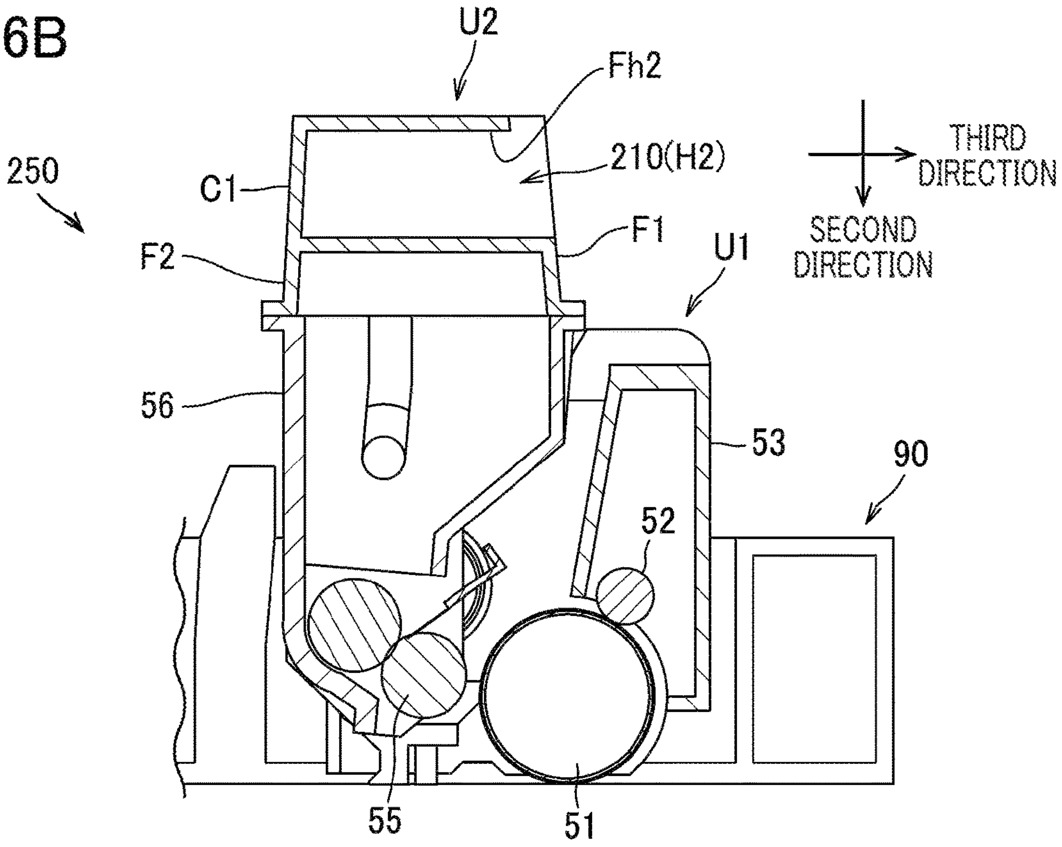
FIG. 6B is a cross-sectional view of the process cartridge illustrated in FIG. 6A.

Specifically, as illustrated in FIG. 6A, the process cartridge 250 includes a developing handle H2 having a recessed portion 210. The recessed portion 210 of the process cartridge 250 is different from the recessed portion 110 of the process cartridge 50 of the first embodiment in that the recessed portion 210 is recessed from the first surface F1 toward the other side in the third direction. That is, as illustrated in FIG. 6B, the recessed portion 210 is open toward the one side in the third direction to provide an operation surface Fh2 facing toward the one side in the second direction. With this structure, a user can easily recognize the developing handle H2 and the opening of the recessed portion 210 when the drawer 90 is pulled out of the main housing 10 toward the one side in the third direction.

Third Embodiment

Next, a process cartridge 350 according to a third embodiment will be described with reference to FIGS. 7A through 8, wherein like parts and components are designated by the same reference numerals as those of the first embodiment illustrated in FIGS. 1 through 5C to avoid duplicating description.

Figure 7A:
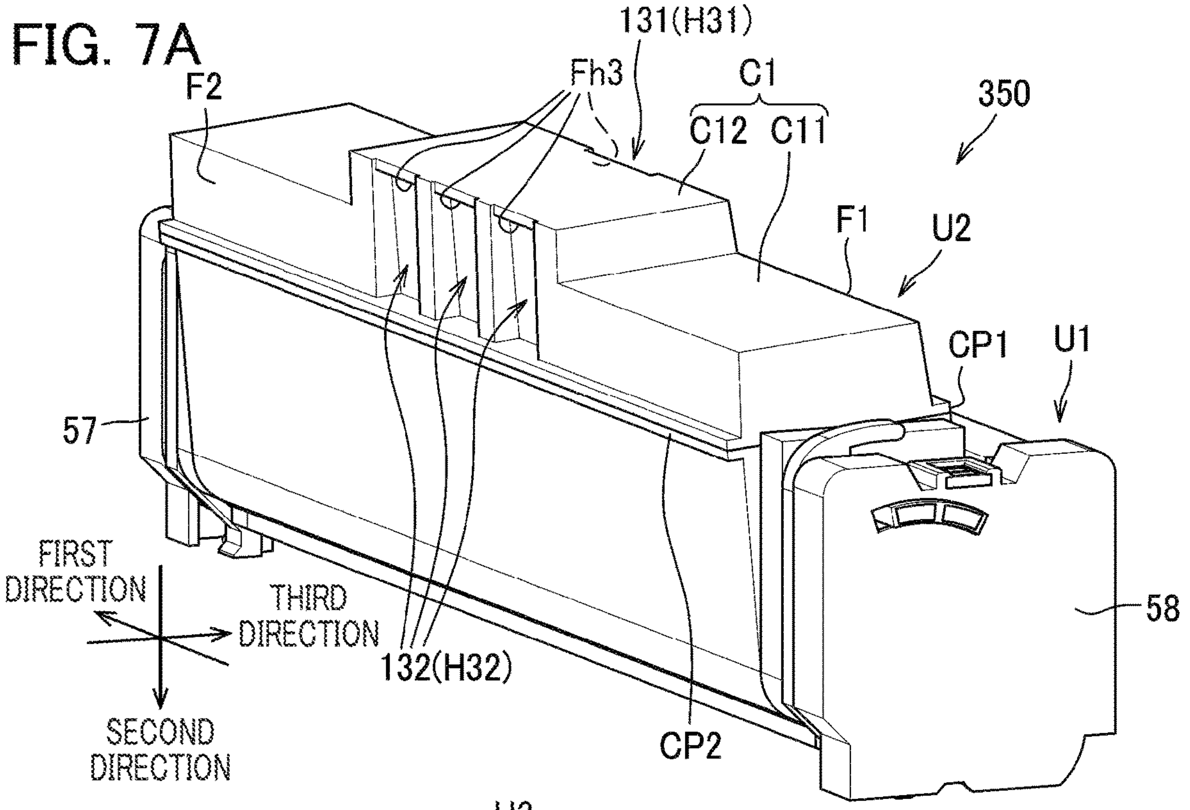
FIG. 7A is a perspective view of a process cartridge according to a third embodiment as viewed from the other side in the third direction.
Figure 7B:
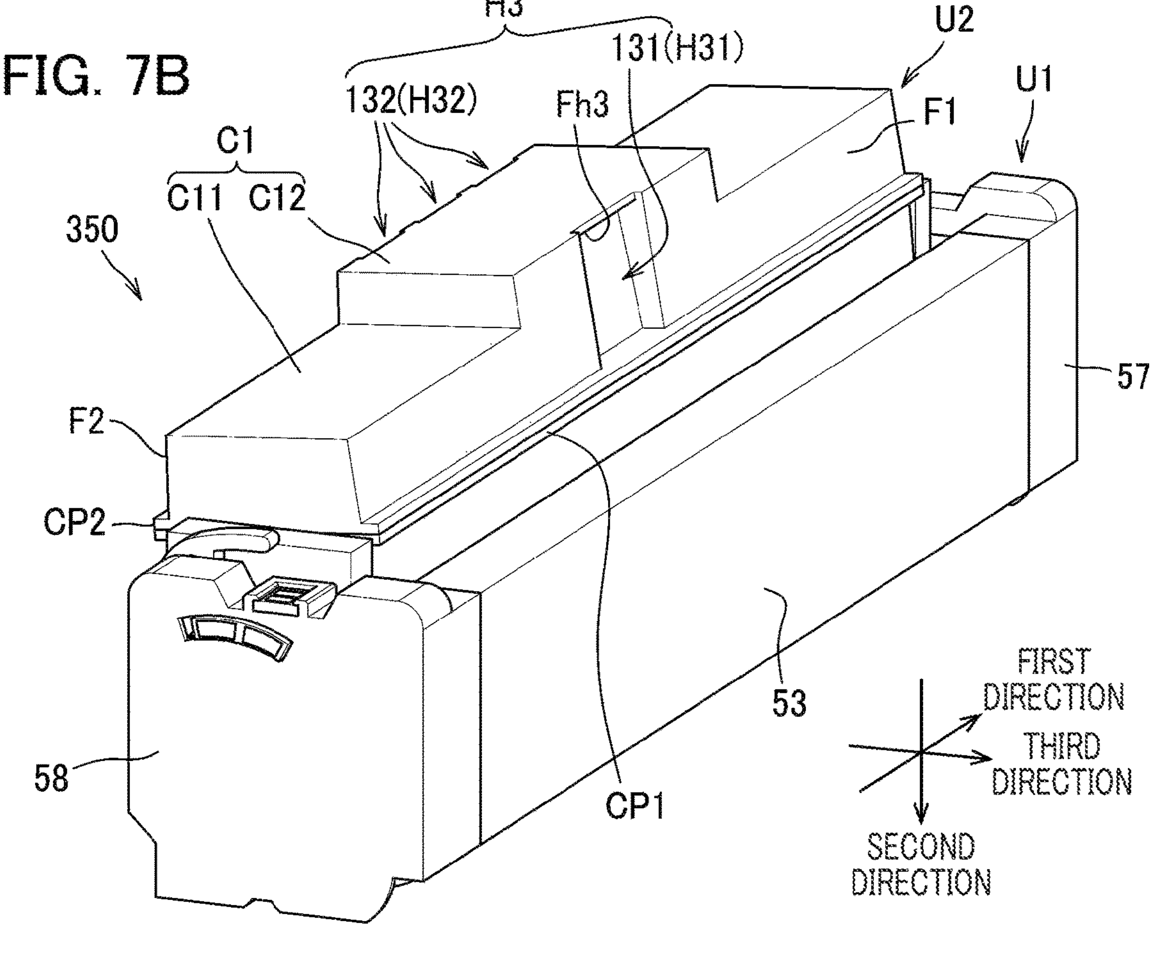
FIG. 7B is a perspective view of the process cartridge illustrated in FIG. 7A as viewed from the one side in the third direction.
Figure 8:
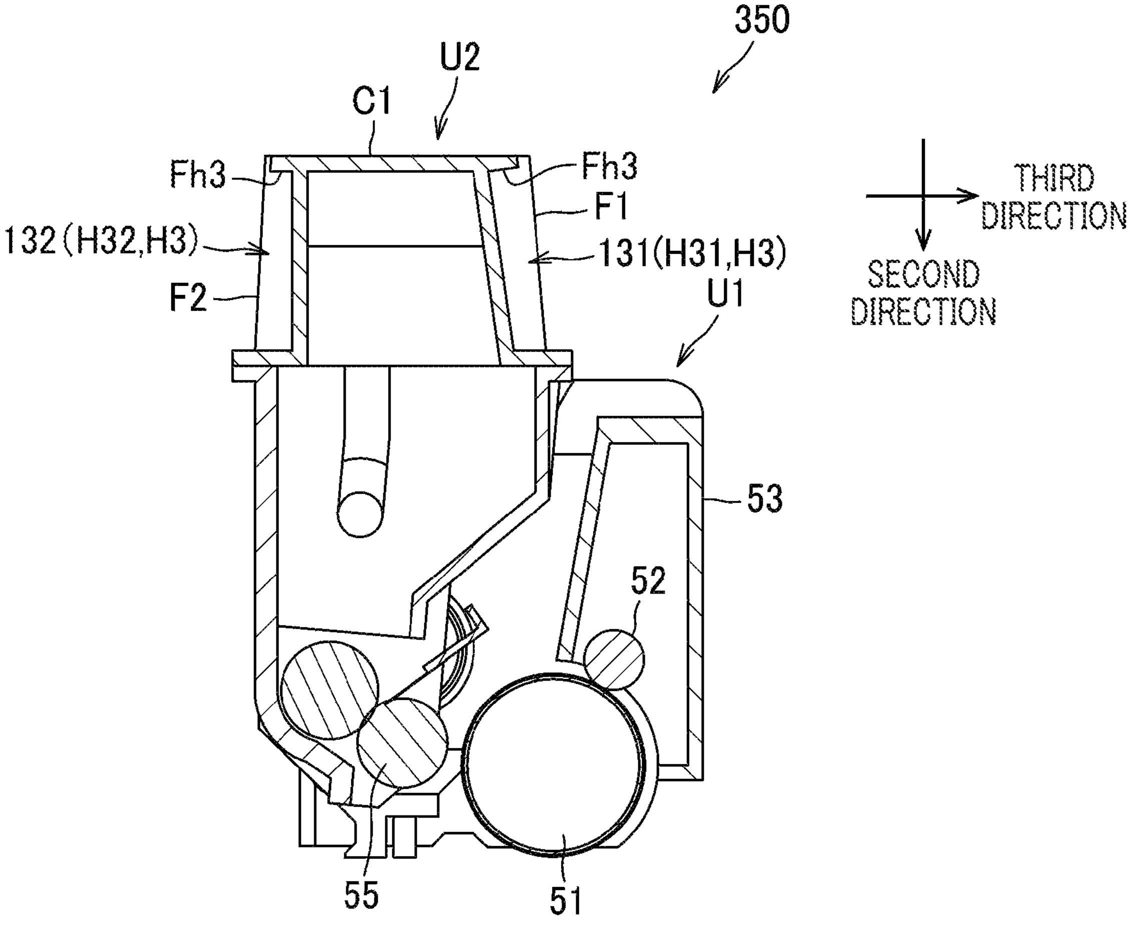
FIG. 8 is a cross-sectional view of the process cartridge illustrated in FIGS. 7A and 7B.

Specifically, as illustrated in FIGS. 7A and 7B, the process cartridge 350 according to the third embodiment includes a developing handle H3 which is different from the developing handle H1 of the first embodiment. The developing handle H3 is configured of a first developing handle H31 and a second developing handle H32.

The first developing handle H31 is positioned at the one end of the convex portion C1 at the one side in the third direction. Specifically, the first developing handle H31 is positioned at the first surface F1. The first developing handle H31 has a single recessed portion 131.

The recessed portion 131 is positioned at the first surface F1. The recessed portion 131 is at the center portion of the convex portion C1 in the first direction. The recessed portion 131 is arranged to span across the first part C11 and the second part C12. The recessed portion 131 has one end in the second direction that is positioned on the first joining portion CP1.

The recessed portion 131 has a structure the same as that of the recessed portion 110 of the first embodiment, except for dimensions in respective directions. Specifically, the recessed portion 131 has five inner surfaces. Among the five inner surfaces, the inner surface positioned at the other side in the second direction (i.e., upper inner surface in FIG. 7B) functions as an operation surface Fh3 of the recessed portion 131 (see also FIG. 8).

The second developing handle H32 is positioned at the other end of the convex portion C1 at the other side in the third direction. Specifically, the second developing handle H32 is positioned at the second surface F2. The second developing handle H32 has three recessed portions 132.

The three recessed portions 132 are positioned at the second surface F2. The three recessed portions 132 are arranged in line at intervals in the first direction. The three recessed portions 132 are positioned at the center portion of the convex portion C1 in the first direction. Each recessed portion 132 has a configuration substantially the same as that of the recessed portion 131.

Specifically, each recessed portion 132 is arranged to span across the first part C11 and the second part C12. Each recessed portion 132 has one end in the second direction that is positioned on the second joining portion CP2.

Each recessed portion 132 has five inner surfaces. Among the five inner surfaces, the inner surface positioned at the other side in the second direction (i.e., upper inner surface in FIG. 7A) functions as an operation surface Fh3 of each recessed portion 132 (see also FIG. 8). Each recessed portion 132 is positioned apart from the recessed portion 131 in the third direction.

According to the configuration of the third embodiment, the first developing handle H31 is positioned on the one side of the convex portion C1 in the third direction, while the second developing handle H32 is positioned on the other side of the convex portion C1 in the third direction. With this structure, for holding the convex portion C1 with user's hand, the user can grab the convex portion C1 in the third direction such that his thumb is hooked to the first developing handle H31 (recessed portion 131), and his remaining fingers are hooked to the second developing handle H32 (three recessed portions 132). Hence, the process cartridge 350 can be detached from the drawer 90 easily.

Further, since the three recessed portions 132 are arrayed in line at intervals in the first direction, the recessed portions 132 can respectively receive the user's different fingers therein. In this way, since the user can hold the process cartridge 350 with his fingers hooked with the corresponding recessed portions 132, detachment of the process cartridge 350 from the drawer 90 can be facilitated.

Incidentally, the number of the recessed portions 132 need not be three, but may be two or not less than four. Further, contrary to the developing handle H3 of the third embodiment, a plurality of recessed portions may be positioned at the first surface F1, and a single recessed portion may be positioned at the second surface F2.

Fourth Embodiment

Next, a process cartridge 450 according to a fourth embodiment will be described with reference to FIGS. 9A and 9B, wherein like parts and components are designated by the same reference numerals as those of the third embodiment illustrated in FIGS. 7A through 8 to avoid duplicating description.

Figure 9A:
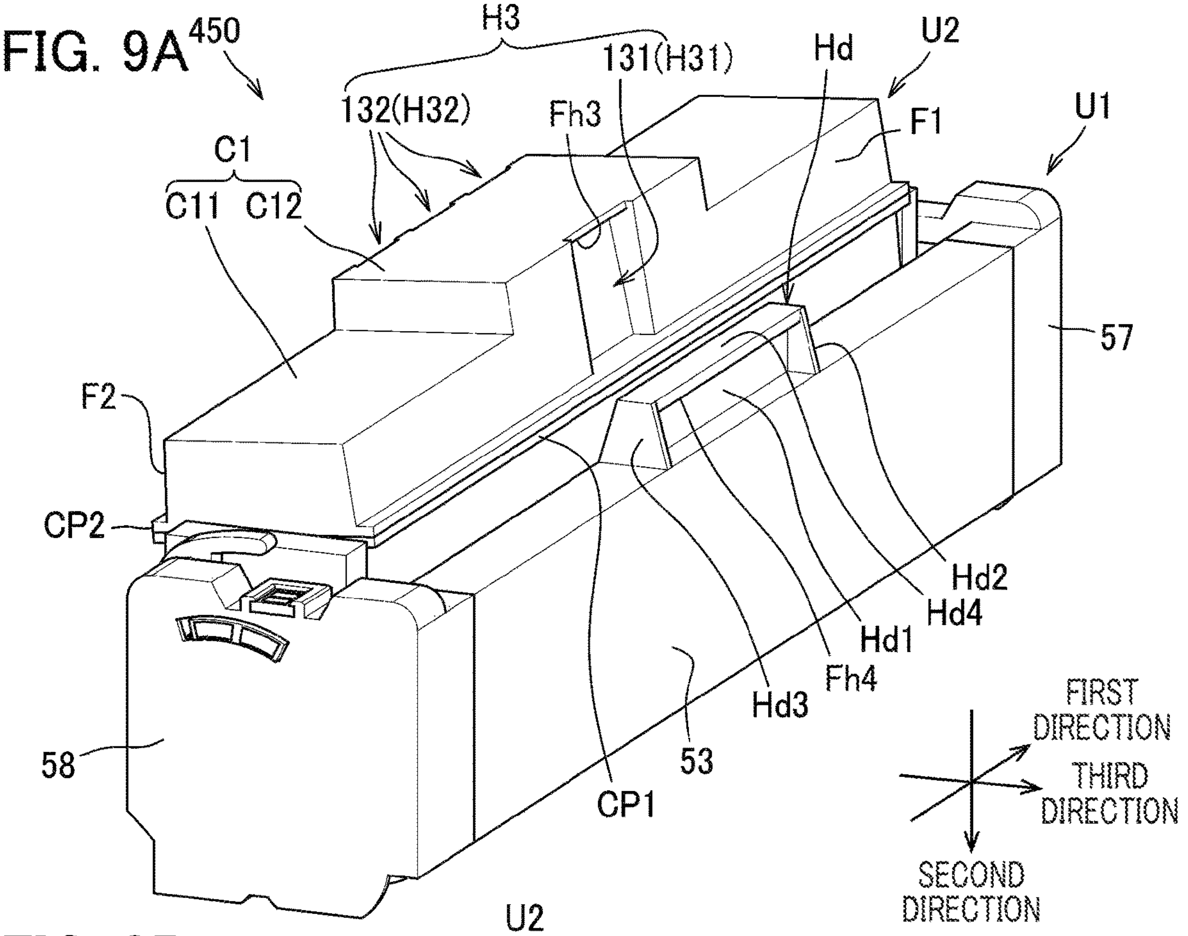
FIG. 9A is a perspective view of a process cartridge according to a fourth embodiment of the disclosure.
Figure 9B:
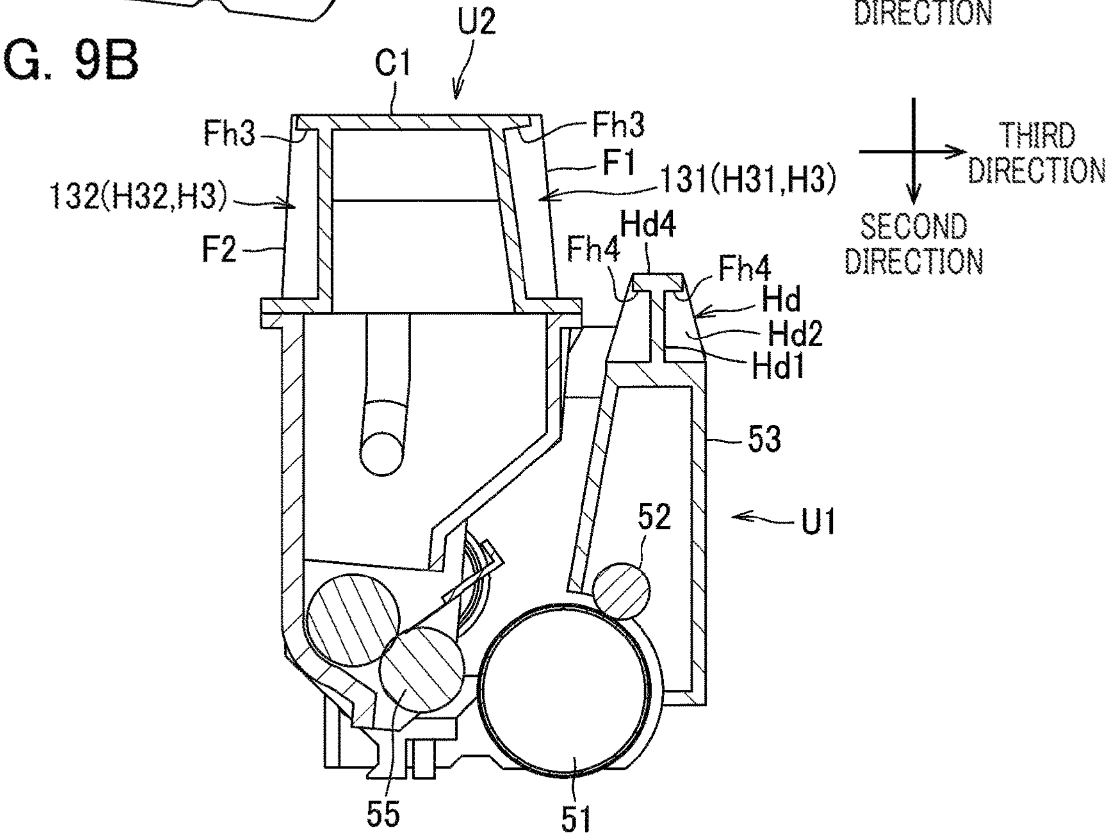
FIG. 9B is a cross-sectional view of the process cartridge illustrated in FIG. 9A.

Specifically, as illustrated in FIGS. 9A and 9B, in the process cartridge 450 according to the fourth embodiment, the drum unit U1 further includes a drum handle Hd, in addition to the developing handle H3 of the third embodiment at the developing unit U2. The drum handle Hd protrudes toward the other side in the second direction (upward in FIG. 9B) from the drum housing 53. The drum handle Hd is so shaped that user's fingers can be hooked with the drum handle Hd from the one side thereof in the second direction (from below in FIG. 9A).

Specifically, the drum handle Hd includes a first wall Hd1, a second wall Hd2, a third wall Hd3, and a fourth wall Hd4.

The first wall Hd1 extends in the first direction. The first wall Hd1 protrudes in the second direction toward the other side from the center portion of the drum housing 53 in the first direction.

The second wall Hd2 is positioned at one end of the first wall Hd1 in the first direction. The second wall Hd2 protrudes from the first wall Hd1 in the third direction both toward the one side and toward the other side.

The third wall Hd3 is positioned at another end of the first wall Hd1 in the first direction. The third wall Hd3 protrudes from the first wall Hd1 in the third direction both toward the one side and toward the other side.

The fourth wall Hd4 is positioned at respective ends of the first wall Hd1, the second wall Hd2, and the third wall Hd3 at the other side in the second direction. The fourth wall Hd4 protrudes from the first wall Hd1 in the third direction both toward the one side and toward the other side. Thus, the fourth wall Hd4 has two operation surfaces Fh4, as illustrated in FIG. 9B. One of the two operation surfaces Fh4 is positioned on the one side of the first wall Hd1 in the third direction, while the other one of the two operation surfaces Fh4 is positioned on the other side of the first wall Hd1 in the third direction.

According to the structure of the fourth embodiment, a user can also hook his fingers with the drum handle Hd to detach the process cartridge 450 from the drawer 90. Further, the user can also hook his thumb with the drum handle Hd and hook his remaining fingers with the second developing handle H32 at the second surface F2 for detaching the process cartridge 450 from the drawer 90. With this structure, the process cartridge 450 can be detached in a stabilized posture from the drawer 90.

Fifth Embodiment

Next, a process cartridge 550 according to a fifth embodiment will be described with reference to FIGS. 10A through 11, wherein like parts and components are designated by the same reference numerals as those of the third embodiment illustrated in FIGS. 7A through 8 to avoid duplicating description.

Figure 10A:
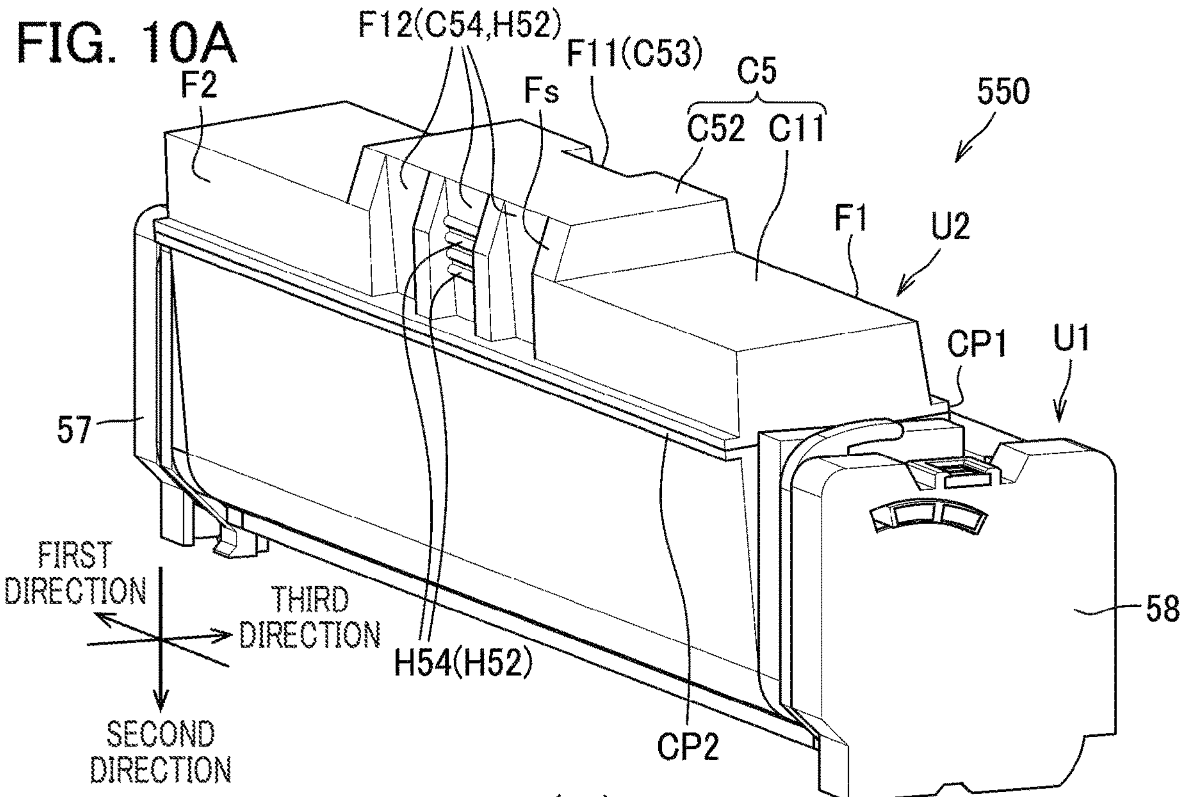
FIG. 10A is a perspective view of a process cartridge according to a fifth embodiment as viewed from the other side in the third direction.
Figure 10B:
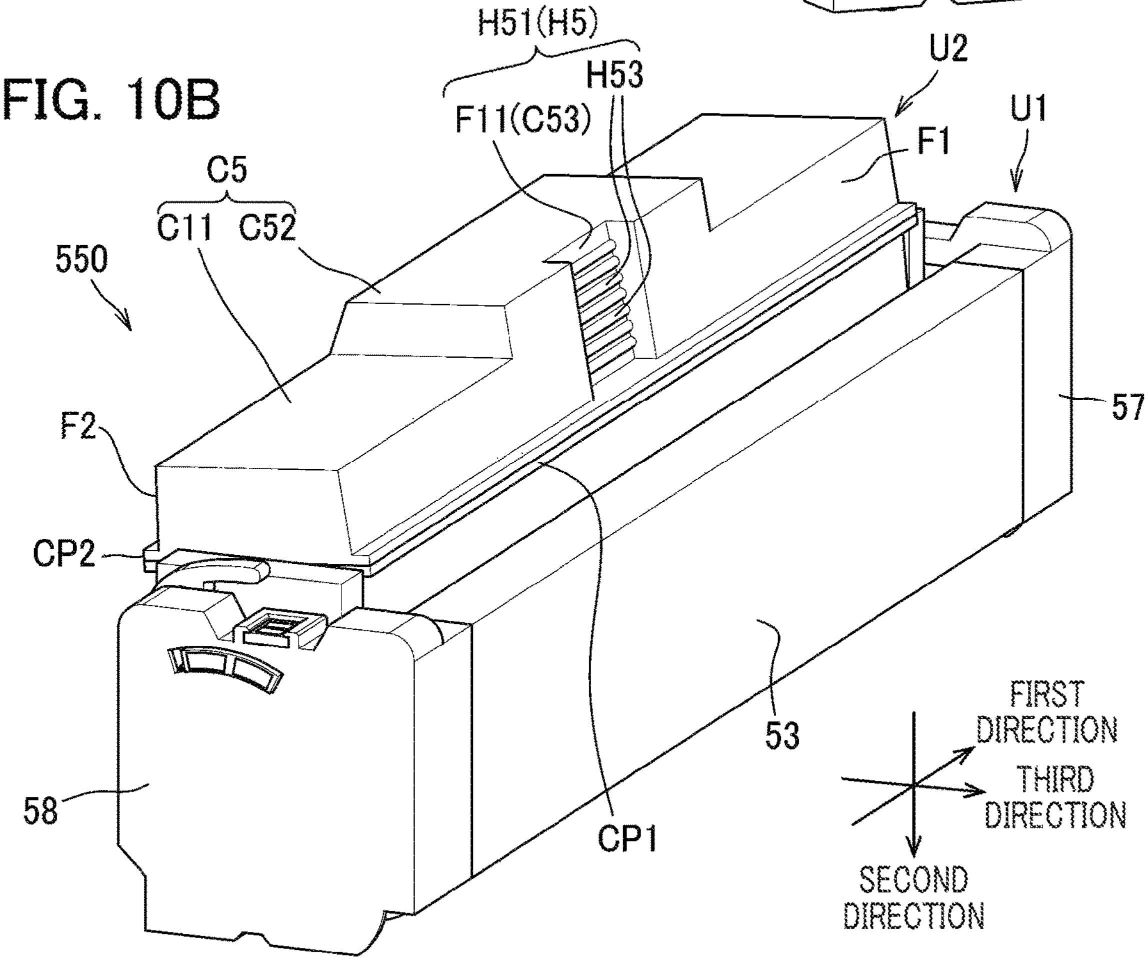
FIG. 10B is a perspective view of the process cartridge illustrated in FIG. 10A as viewed from the one side in the third direction.
Figure 11:
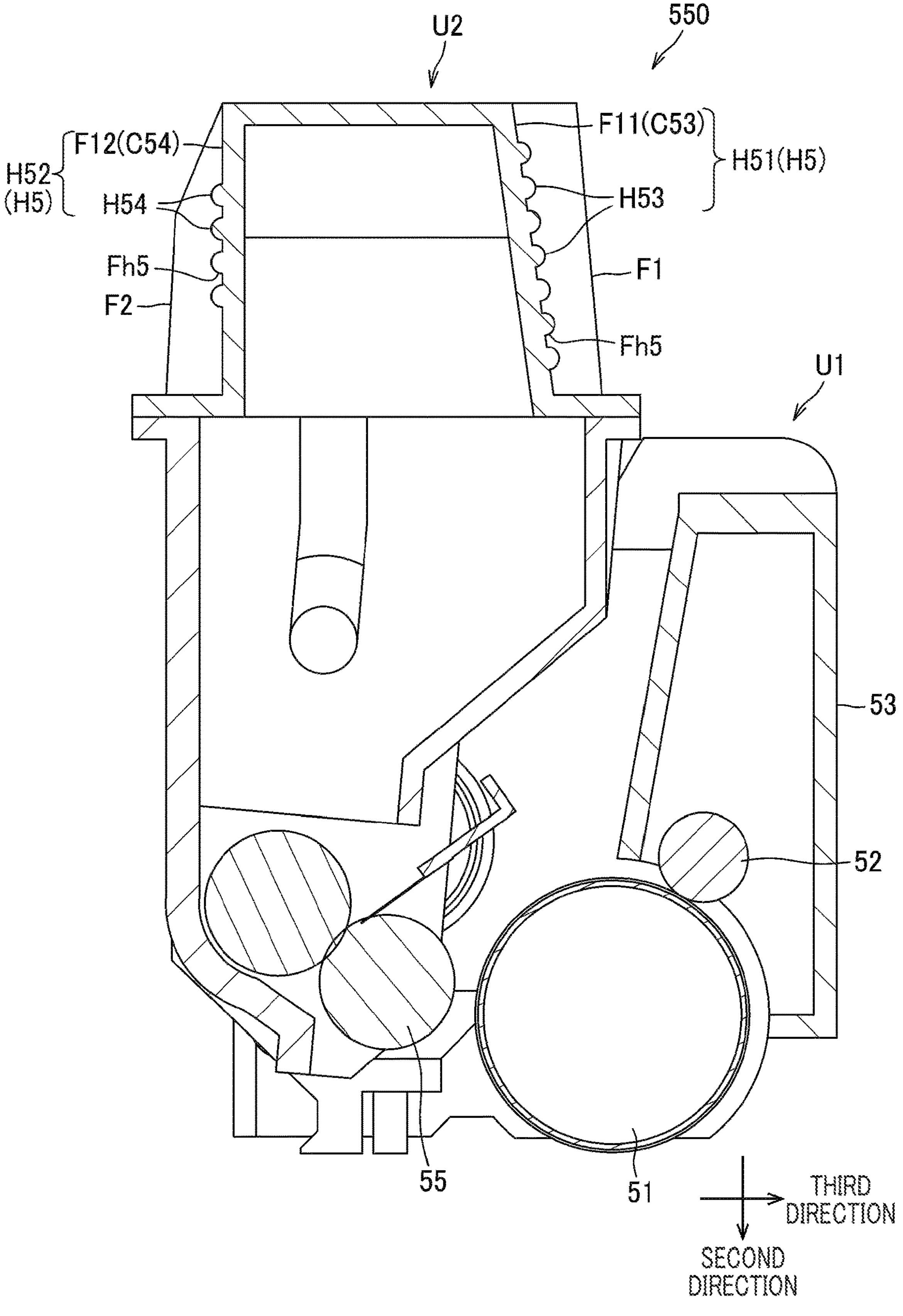
FIG. 11 is a cross-sectional view of the process cartridge illustrated in FIGS. 10A and 10B.

As illustrated in FIGS. 10A and 10B, the process cartridge 550 according to the fifth embodiment includes a convex portion C5 different from the convex portion C1 of the third embodiment, and a developing handle H5 instead of the developing handle H3 of the third embodiment.

The convex portion C5 includes the first part C11, and a second part C52 in place of the second part C12 of the third embodiment. The second part C52 has a sloped surface Fs.

The sloped surface Fs extends from another end of the second surface F2 of the first part C11 in the second direction to another end of the second part C52 in the second direction. The sloped surface Fs is sloped such that the sloped surface Fs diagonally extends toward the one side in the third direction as extending toward the other side in the second direction.

The convex portion C5 further includes a single first recessed portion C53 and three second recessed portions C54.

The first recessed portion C53 is positioned at the first surface F1. The first recessed portion C53 is recessed from the first surface F1 toward the other side in the third direction. The first recessed portion C53 is positioned at a center portion of the convex portion C5 in the first direction. The first recessed portion C53 is open toward the other side in the second direction. The first recessed portion C53 has one end at the one side in the second direction that is positioned on the first joining portion CP1. The first recessed portion C53 has a bottom surface F11. The bottom surface F11 is an inner surface of the first recessed portion C53 at the other side in the third direction.

The second recessed portions C54 are positioned at the second surface F2. Each second recessed portion C54 is recessed from the second surface F2 toward the one side in the third direction. The three second recessed portions C54 are positioned at the center portion of the convex portion C5 in the first direction. Each second recessed portion C54 is open toward the other side in the second direction. Each second recessed portion C54 has one end at the one side in the second direction that is positioned on the second joining portion CP2. Each second recessed portion C54 has a bottom surface F12. The bottom surface F12 is an inner surface of the second recessed portion C54 at the one side in the third direction.

The developing handle H5 is configured of a first developing handle H51 and a second developing handle H52.

The first developing handle H51 includes the first recessed portion C53 and a plurality of protrusions H53. The protrusions H53 are arrayed in line at intervals in the second direction. The plurality of protrusions H53 is positioned on the bottom surface F11 of the first recessed portion C53. Each protrusion H53 protrudes from the bottom surface F11 toward the one side in the third direction. As illustrated in FIG. 11, each protrusion H53 has an operation surface Fh5 facing toward the one side in the second direction. At least a part of each protrusion H53 has a friction coefficient higher than a friction coefficient of the first surface F1.

The second developing handle H52 includes the three second recessed portions C54 and a plurality of protrusions H54. The protrusions H54 are arrayed with each other at intervals in the second direction. The plurality of protrusions H54 is positioned on the bottom surface F12 of the second recessed portion C54 at the center among the three second recessed portions C54. Each protrusion H54 protrudes toward the other side in the third direction from the bottom surface F12 of the center second recessed portion C54. As illustrated in FIG. 11, each protrusion H54 has an operation surface Fh5 facing toward the one side in the second direction. At least a part of each protrusion H54 has a friction coefficient higher than a friction coefficient of the second surface F2.

According to the structure of the fifth embodiment, the protrusions H53 are arranged in line at intervals in the second direction and the protrusions H54 are also arranged in line at intervals in the second direction. Since these protrusions H53 and H54 arranged in line in the second direction can serve to provide an anti-slipping function, detachment of the process cartridge 550 from the drawer 90 can be facilitated.

Sixth Embodiment

Next, a process cartridge 650 according to a sixth embodiment will be described with reference to FIGS. 12A through 13, wherein like parts and components are designated by the same reference numerals as those of the fifth embodiment illustrated in FIGS. 10A through 11 to avoid duplicating description.

The process cartridge 650 of the sixth embodiment is different from the process cartridge 550 of the fifth embodiment in that the process cartridge 650 has a developing handle different from the developing handle H5.

Figure 12A:
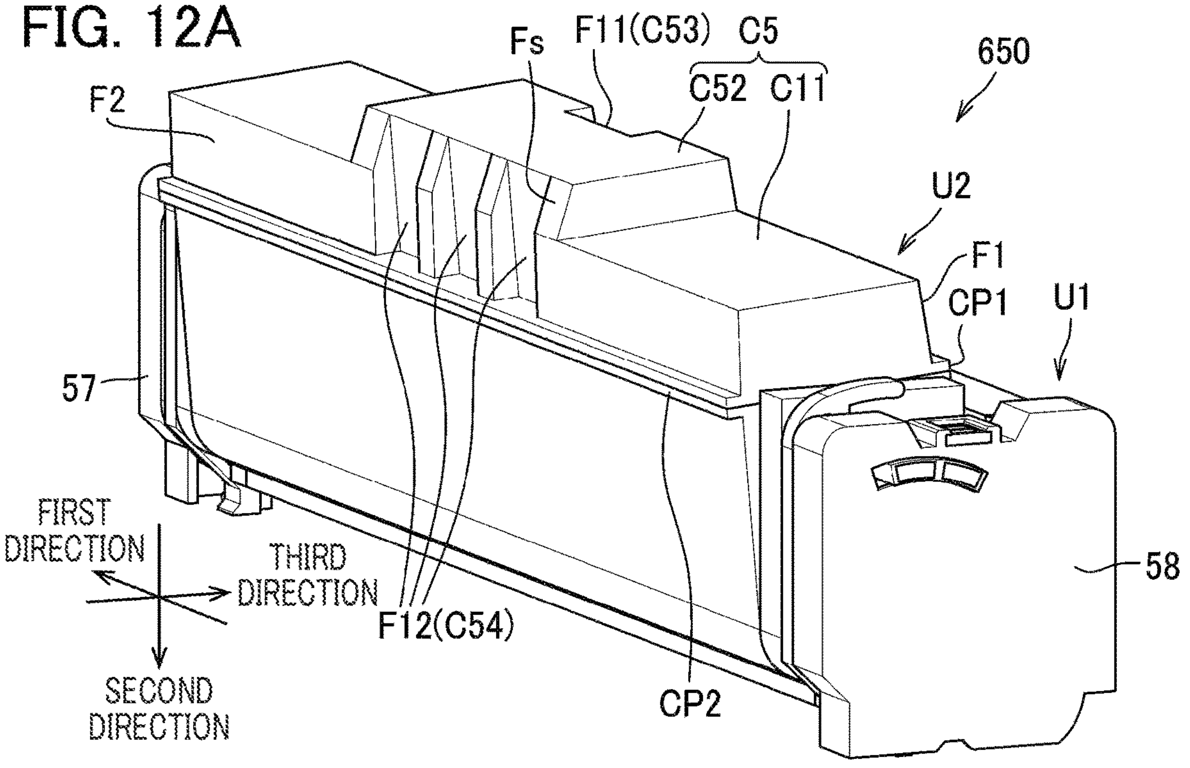
FIG. 12A is a perspective view of a process cartridge according to a sixth embodiment as viewed from the other side in the third direction.
Figure 12B:
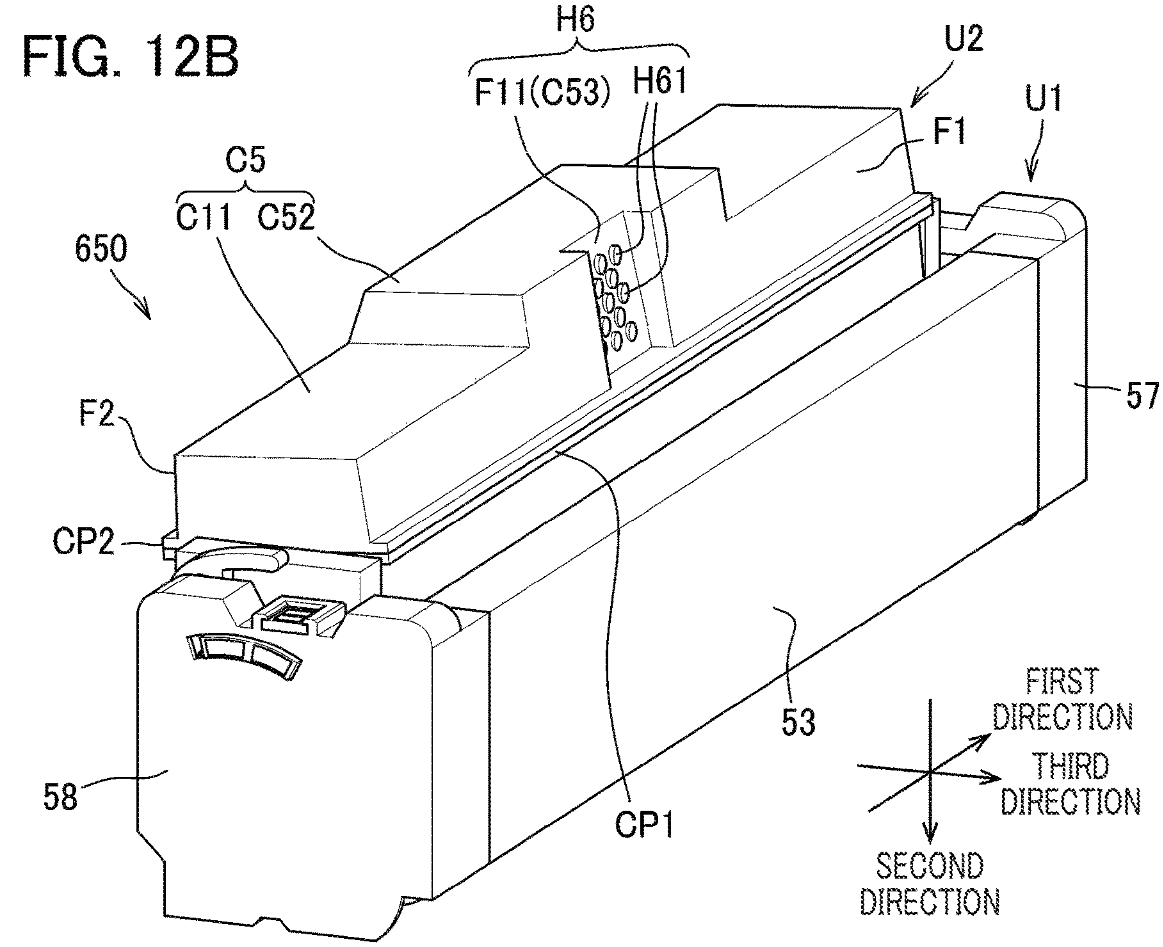
FIG. 12B is a perspective view of the process cartridge illustrated in FIG. 12A as viewed from the one side in the third direction.
Figure 13:
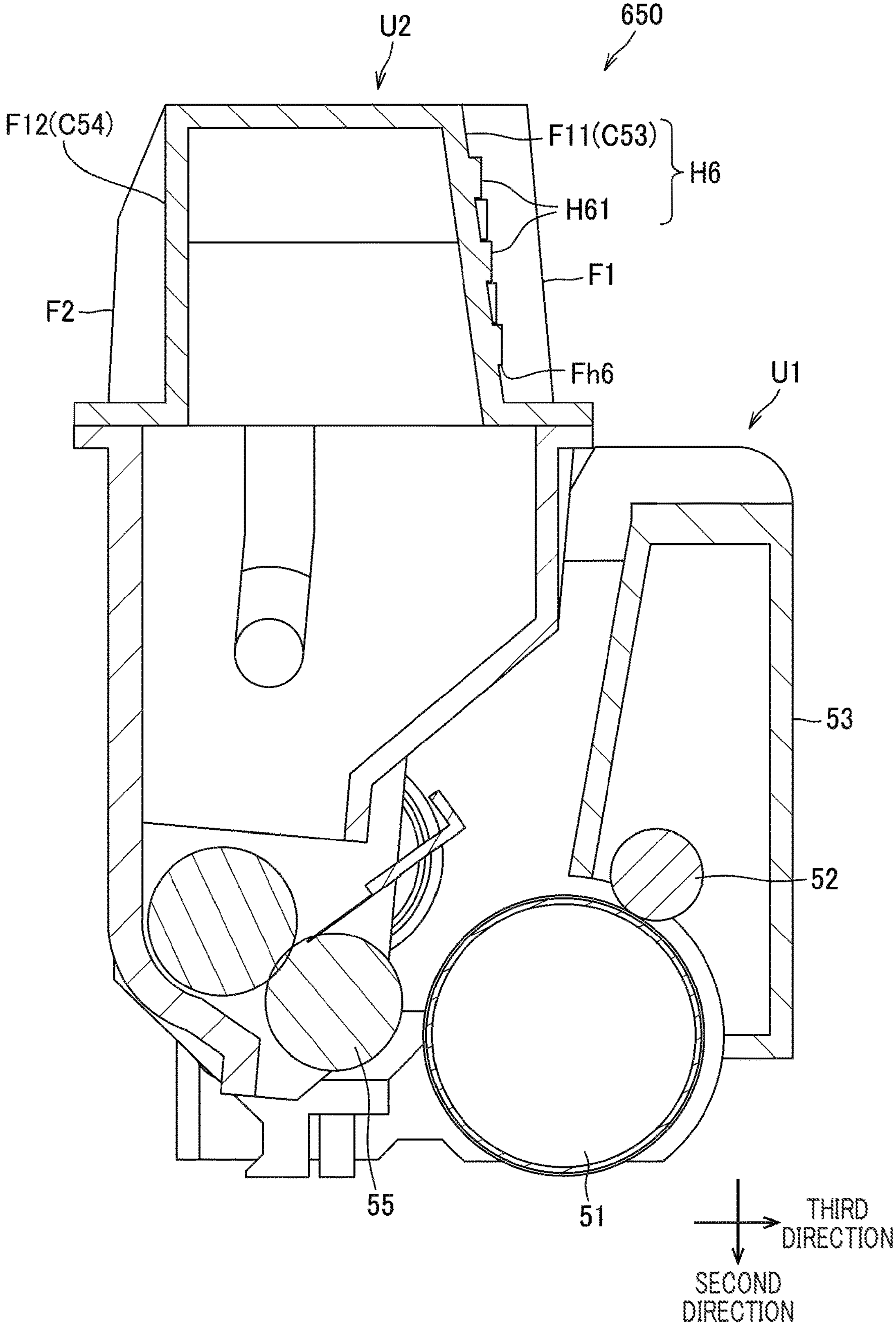
FIG. 13 is a cross-sectional view of the process cartridge illustrated in FIGS. 12A and 12B.

Specifically, as illustrated in FIGS. 12A and 12B, the process cartridge 650 according to the sixth embodiment includes a developing handle H6, instead of the developing handle H5 of the fifth embodiment.

The developing handle H6 is configured of the first recessed portion C53, and a plurality of protrusions H61. The protrusions H61 are arrayed at intervals in the first direction and in the second direction. The plurality of protrusions H61 are positioned on the bottom surface F11 of the first recessed portion C53. Each protrusion H61 protrudes from the bottom surface F11 toward the one side in the third direction. As illustrated in FIG. 13, each protrusion H61 has an operation surface Fh6 facing toward the one side in the second direction. At least a part of each protrusion H61 has a friction coefficient higher than the friction coefficient of the first surface F1.

According to the structure of the sixth embodiment, the protrusions H61 can serve to provide an anti-slipping function as in the fifth embodiment, thereby facilitating detachment of the process cartridge 650 from the drawer 90.

Seventh Embodiment

Next, a process cartridge 750 according to a seventh embodiment will be described with reference to FIGS. 14A through 15, wherein like parts and components are designated by the same reference numerals as those of the fifth embodiment illustrated in FIGS. 10A through 11 to avoid duplicating description.

The process cartridge 750 of the seventh embodiment is different from the process cartridge 550 of the fifth embodiment in that the process cartridge 750 has a developing handle H7 different from the developing handle H5 of the fifth embodiment.

Figure 14A:
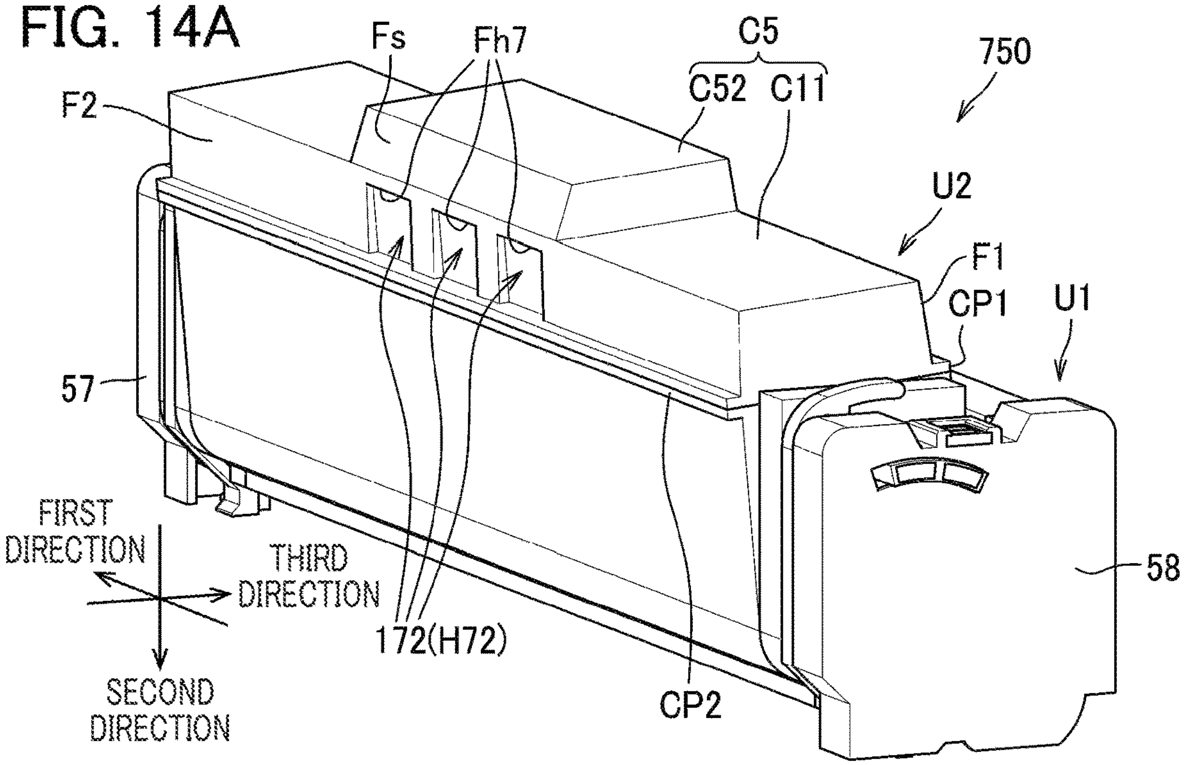
FIG. 14A is a perspective view of a process cartridge according to a seventh embodiment as viewed from the other side in the third direction.
Figure 14B:
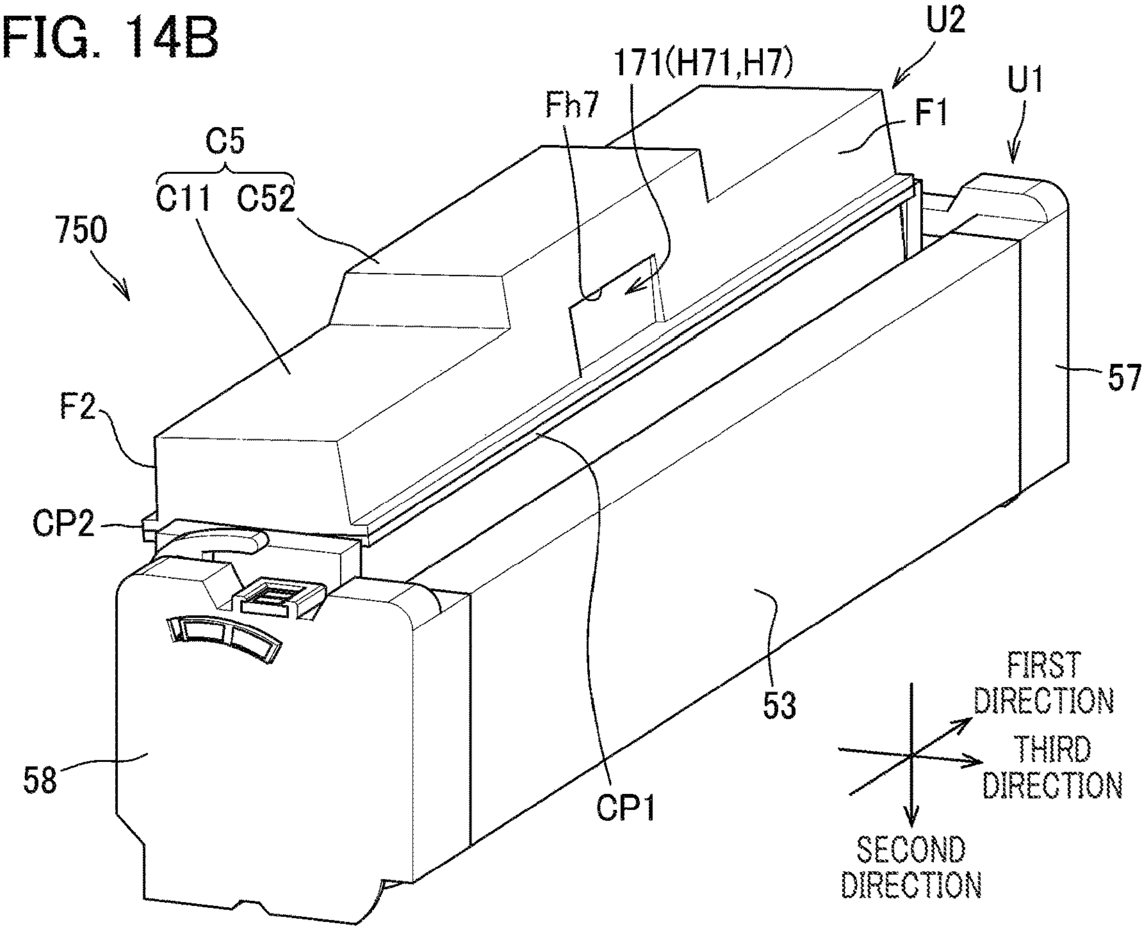
FIG. 14B is a perspective view of the process cartridge illustrated in FIG. 14A as viewed from the one side in the third direction.

Specifically, as illustrated in FIGS. 14A and 14B, the developing handle H7 of the seventh embodiment is configured of a first developing handle H71 and a second developing handle H72.

The first developing handle H71 is positioned at the one end of the convex portion C5 at the one side in the third direction. The first developing handle H71 is positioned at the first surface F1. The first developing handle H71 is positioned in the first part C11 of the convex portion C5, but is not positioned in the second part C52. The first developing handle H71 has a single recessed portion 171.

The recessed portion 171 is positioned at the first surface F1. The recessed portion 171 is positioned at the center portion of the convex portion C5 in the first direction. The recessed portion 171 has one end at the one side in the second direction that is positioned on the first joining portion CP1.

The recessed portion 171 has a configuration the same as that of the recessed portion 110 of the first embodiment, except for dimensions in respective directions. Specifically, the recessed portion 171 has five inner surfaces. Among the five inner surfaces, the inner surface at the other side in the second direction (the upper inner surface in FIG. 14B) functions as an operation surface Fh7 (see also FIG. 15).

The second developing handle H72 is positioned at the other end of the convex portion C5 at the other side in the third direction. The second developing handle H72 is positioned at the second surface F2. The second developing handle H72 is positioned in the first part C11 of the convex portion C5, but is not positioned in the second part C52. The second developing handle H72 has three recessed portions 172.

The three recessed portions 172 are positioned at the second surface F2. The three recessed portions 172 are arrayed in line at intervals in the first direction. The three recessed portions 172 are positioned at the center portion of the convex portion C5 in the first direction. Each recessed portion 172 has substantially the same configuration as the recessed portion 171.

Each recessed portion 172 is positioned in the first part C11 of the convex portion C5. Each recessed portion 172 has one end in the second direction that is positioned on the second joining portion CP2.

Figure 15:
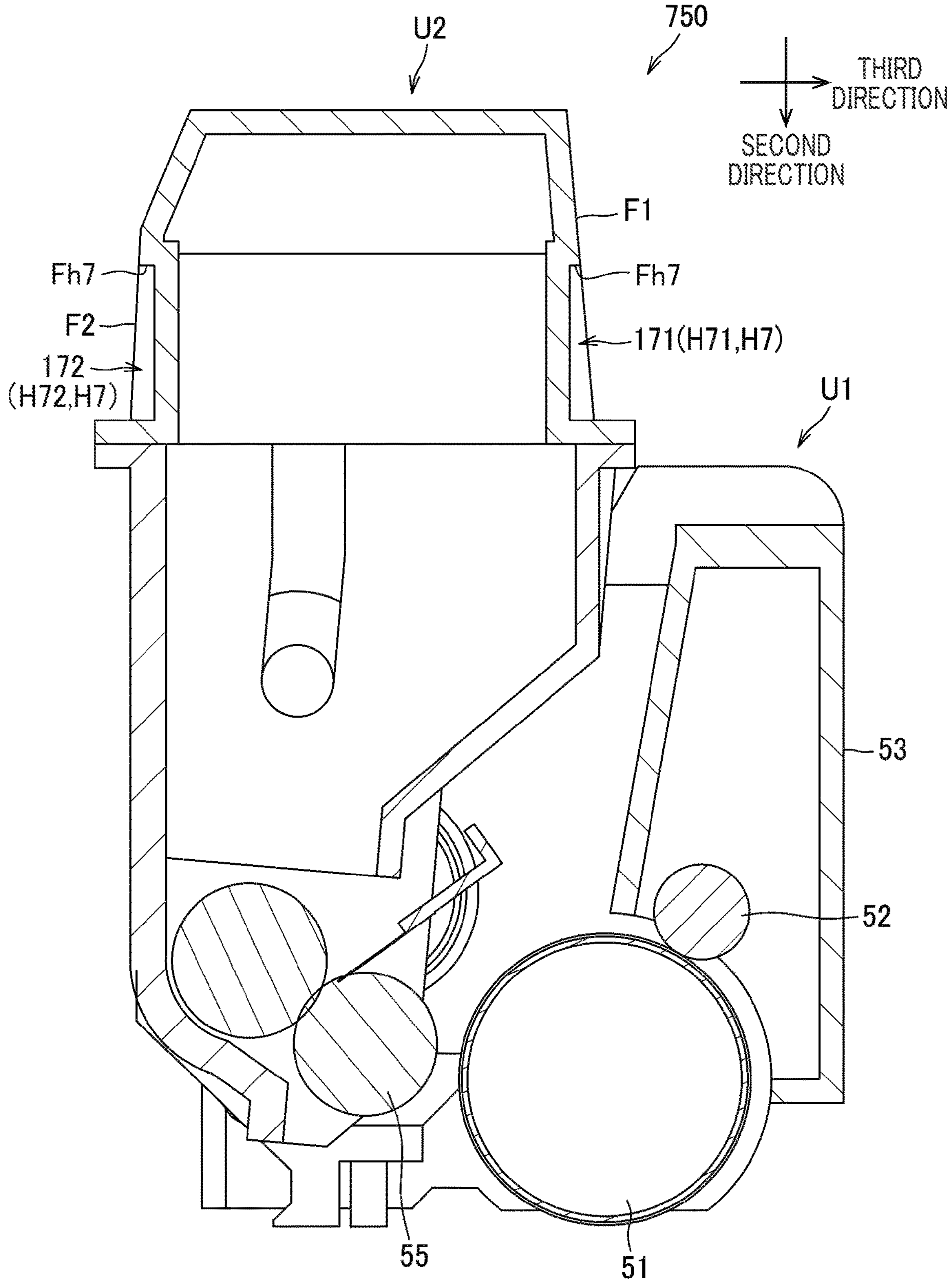
FIG. 15 is a cross-sectional view of the process cartridge illustrated in FIGS. 14A and 14B.

Each recessed portion 172 has five inner surfaces. Among the five inner surfaces, the inner surface at the other side in the second direction (the upper inner surface in FIG. 14A)

functions as an operation surface Fh7 (see also FIG. 15). Each recessed portion 172 is positioned apart from the recessed portion 171 in the third direction.

The configuration of the seventh embodiment can also be regarded as a modification to the third embodiment, because, in the process cartridge 750 according to the seventh embodiment, the recessed portions 171, 172 and the second part C52 have different shapes from the recessed portions 131, 132 and the second part C12 of the third embodiment. Hence, the seventh embodiment can exhibit technical advantages similar to those of the third embodiment.

Eighth Embodiment

Next, a process cartridge 850 according to an eighth embodiment will be described with reference to FIGS. 16A through 17, wherein like parts and components are designated by the same reference numerals as those of the first embodiment illustrated in FIGS. 1 through 5C to avoid duplicating description.

Figure 16A:
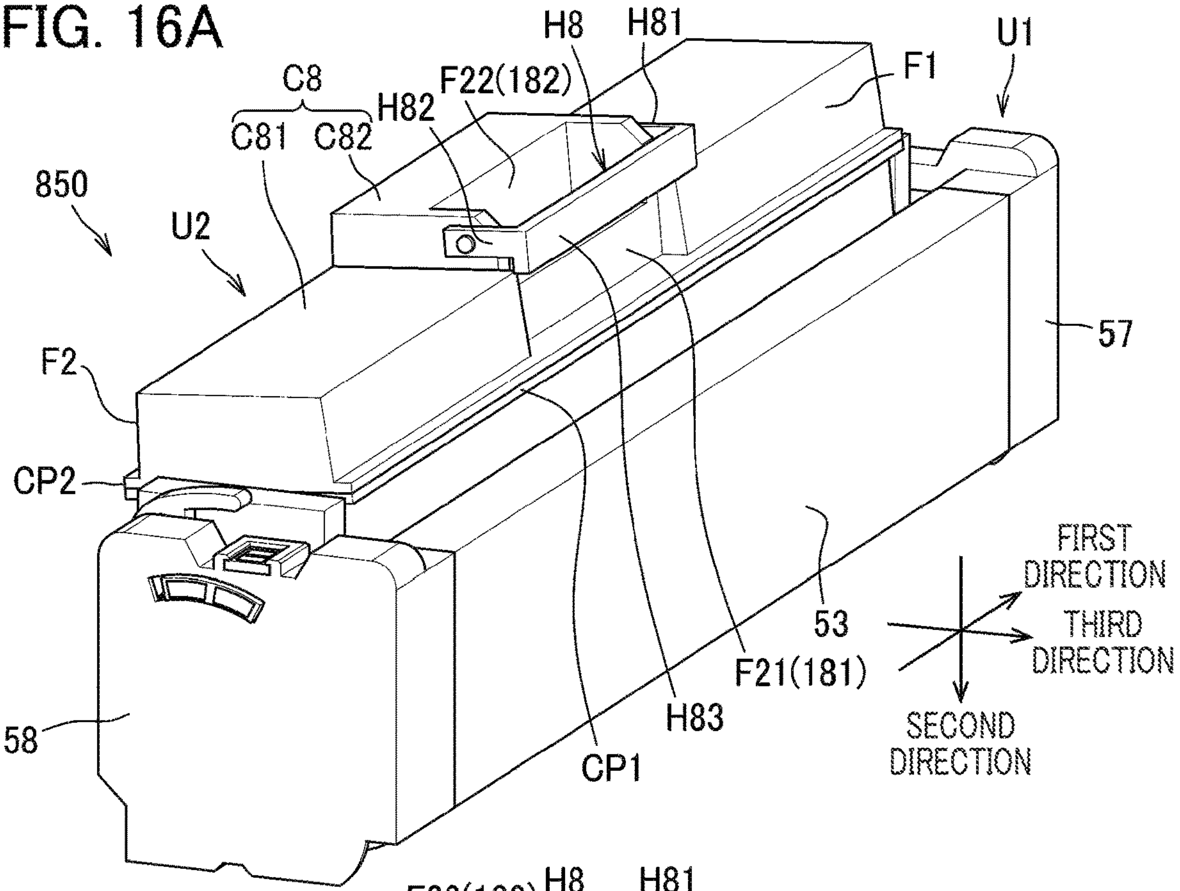
FIG. 16A is a perspective view of a process cartridge according to an eighth embodiment of the disclosure in a state where a developing handle is at a first position.
Figure 16B:
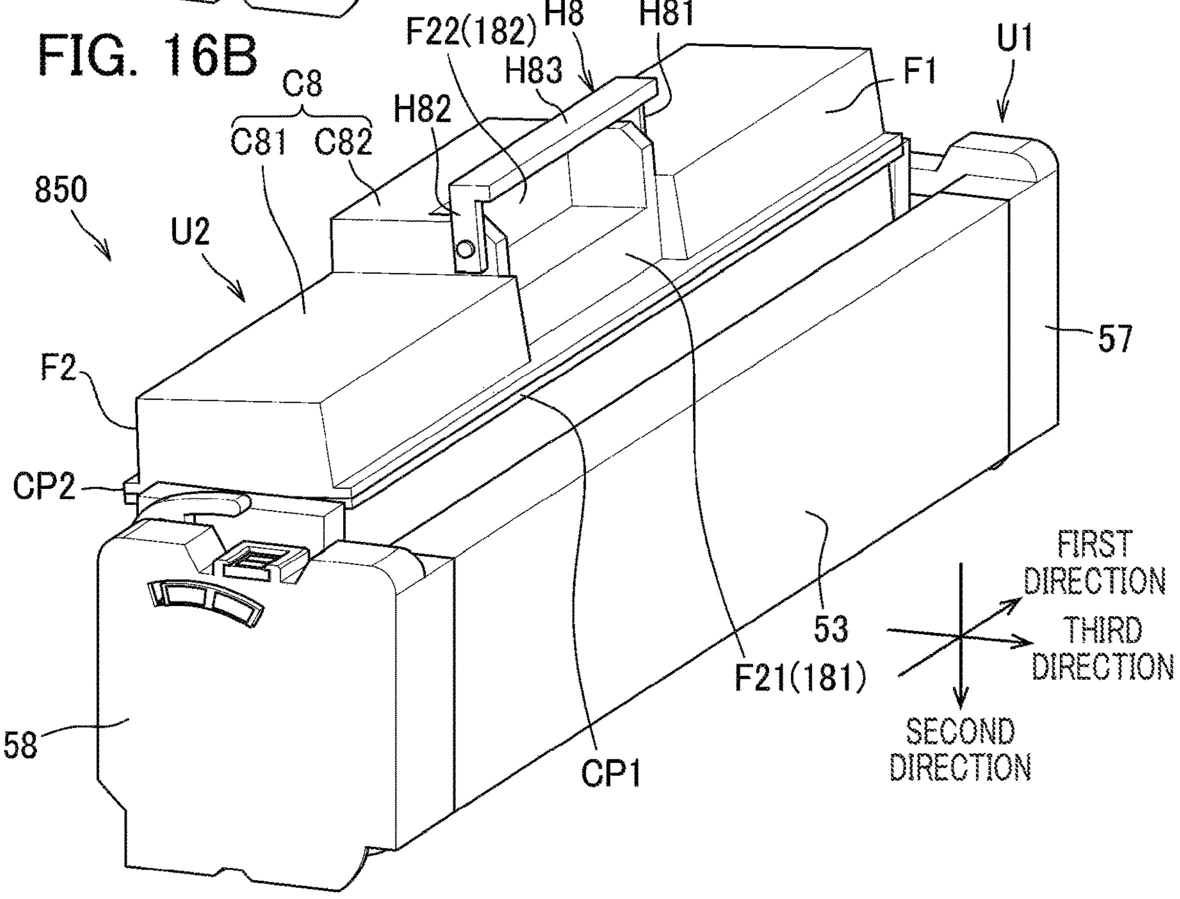
FIG. 16B is a perspective view of the process cartridge illustrated in FIG. 16A in a state where a developing handle is at a second position.

As illustrated in FIGS. 16A and 16B, the process cartridge 850 according to the eighth embodiment includes a developing handle H8 which is different from the developing handle H1 of the first embodiment. Further, the process cartridge 850 has a convex portion C8 in place of the convex portion C1 of the first embodiment.

The convex portion C8 includes a first part C81 corresponding to the first part C11, and a second part C82 corresponding to the second part C12. The convex portion C8 has a first recessed portion 181 and a second recessed portion 182.

The first recessed portion 181 is recessed from the first surface F1 toward the other side in the third direction. The first recessed portion 181 is positioned at a center portion of the first part C81 in the first direction. The first recessed portion 181 is open both in the third direction toward the one side and in the second direction toward the other side. The first recessed portion 181 has a bottom surface F21. The bottom surface F21 is an inner surface of the first recessed portion 181 at the other side in the third direction.

The second recessed portion 182 is recessed toward the other side in the third direction from the bottom surface F21 of the first recessed portion 181. The second recessed portion 182 is positioned in the second part C82. The second recessed portion 182 is open both in the third direction toward the one side and in the second direction toward the other side. The second recessed portion 182 has a bottom surface F22. The bottom surface F22 is an inner surface of the second recessed portion 182 at the other side in the third direction.

The developing handle H8 is positioned at one end portion of the second part C82 at the one side in the third direction. The developing handle H8 is pivotally movable between a first position illustrated in FIGS. 16A and 17B and a second position illustrated in FIGS. 16B and 17A.

Figure 17A:
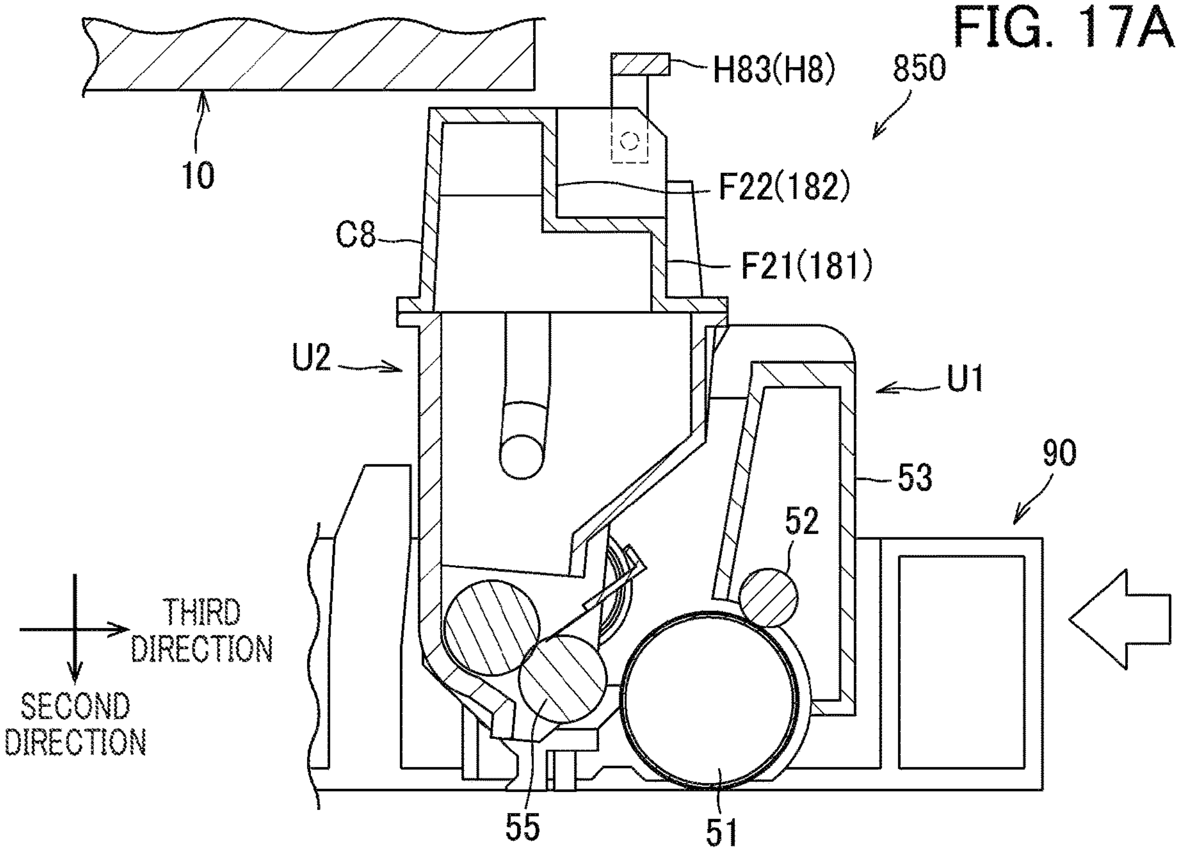
FIG. 17A is a view for description of a movement of the developing handle of the process cartridge according to the eighth embodiment while the drawer to which the process cartridge is attached is being moved into the main housing of the image forming apparatus with the developing handle at the second position.
Figure 17B:
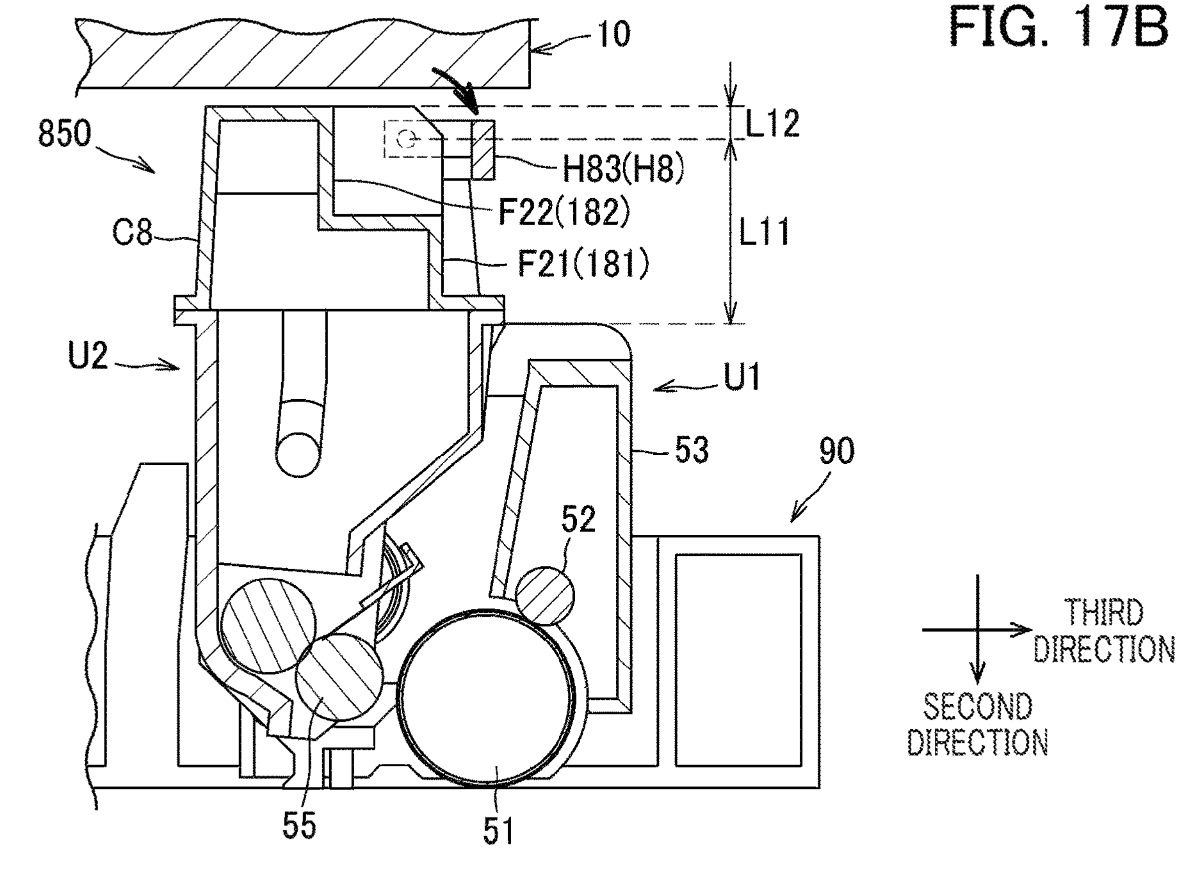
FIG. 17B is a view for description of the movement of the developing handle of the process cartridge according to the eighth embodiment while the drawer to which the process cartridge is attached is being moved into the main housing of the image forming apparatus, and particularly illustrating a state where the developing handle is moved to the first position.

When the developing handle H8 is at the first position, the developing handle H8 does not protrude further toward the other side in the second direction than another end portion of the convex portion C8 in the second direction (see FIG. 17B). In contrast, when the developing handle H8 is at the second position, the developing handle H8 protrudes further toward the other side in the second direction (upward in FIG. 17A) than the other end portion of the convex portion C8 in the second direction (see FIG. 17A).

The developing handle H8 includes a first part H81, a second part H82, and a third part H83.

The first part H81 constitutes one end of the developing handle H8 at the one side in the first direction. The first part H81 is positioned at one end of the second part C82 at the one side in the first direction. Specifically, the first part H81 is pivotally movably connected to the second part C82. When the developing handle H8 is at the first position, a portion of the first part H81 protrudes further toward the one side in the third direction (rightward in FIG. 16A) than the one end portion of the second part C82 at the one side in the third direction. When the developing handle H8 is at the second position, a portion of the first part H81 protrudes further toward the other side in the second direction (upward in FIG. 16B) than the other end of the second part C82 at the other side in the second direction.

The second part H82 constitutes another end of the developing handle H8 at the other side in the first direction. The second part H82 is positioned at another end of the second part C82 at the other side in the first direction. Specifically, the second part H82 is pivotally movably connected to the second part C82. When the developing handle H8 is at the first position, a portion of the second part H82 protrudes further toward the one side in the third direction (rightward in FIG. 16A) than the one end of the second part C82 at the one side in the third direction. When the developing handle H8 is at the second position, a portion of the second part H82 protrudes further toward the other side in the second direction (upward in FIG. 16B) than the other end of the second part C82 at the other side in the second direction.

The third part H83 extends in the first direction to connect the first part H81 and the second part H82 to each other. As illustrated in FIG. 17B, when the developing handle H8 is at the first position, the third part H83 is positioned on the one side of the second recessed portion 182 in the third direction, and also on the other side of the first recessed portion 181 in the second direction. As illustrated in FIG. 17A, when the developing handle H8 is at the second position, the third part H83 is positioned on the other side of the second recessed portion 182 in the second direction.

As illustrated in FIG. 17B, when the developing handle H8 is at the first position, a distance L11 in the second direction from the other end of the drum unit U1 in the second direction to the developing handle H8 is greater than a distance L12 in the second direction from the developing handle H8 to the other end of the convex portion C8 in the second direction. Here, as illustrated in FIG. 17B, the pivot center of the developing handle H8 is assumed to be used as an origin to determine the distances L11, L12 to and from the developing handle H8. However, the above-described positional relationship (defined by the distances L11, L12) among the developing handle H8, the drum unit U1 and the convex portion C8 can be established, regardless of which portion of the developing handle H8 is taken as the origin to determine the distances L11, L12.

As illustrated in FIG. 17A, the developing handle H8 abuts on the main housing 10 in a case where the drawer 90 is moved from the outer position (see FIG. 2) toward the inner position (see FIG. 1) while the process cartridge 850 is attached to the drawer 90 and the developing handle H8 is at the second position. Upon abutment of the developing handle H8 on the main housing 10, the developing handle H8 is pivotally moved from the second position (illustrated in FIG. 17A) to the first position (illustrated in FIG. 17B).

According to the configuration of the eighth embodiment, the developing handle H8 abuts on the main housing 10 to be pivotally moved from the second position to the first position in accordance with the movement of the drawer 90 from the outer position toward the inner position while the developing handle H8 is at the second position (in the state illustrated in FIG. 17A). With this configuration, the drawer 90 can be reliably moved into the inner position, even if a user attempts to move the drawer 90 into the main housing 10 without moving the developing handle H8 to the first position. Further, the developing handle H8 is less likely to get damaged by the movement of the drawer 90 toward the inner position, since the developing handle H8 can readily move to the first position from the second position during the insertion of the drawer 90 into the main housing 10 even if the user fails to move the developing handle H8 to the first position in advance.

Further, a user can easily grasp the developing handle H8, since the developing handle H8 is provided at the second part C82 which protrudes toward the other side in the second direction from the first part C81.

Further, as illustrated in FIG. 17B, the distance L11 is greater than the distance L12 in the second direction, meaning that the developing handle H8 is positioned closer to the other end of the convex portion C8 at the other side in the second direction (the second part C82) than to the other end of the drum unit U1 in the second direction. This structure also enables the user to easily hold the developing handle H8.

Ninth Embodiment

Next, a process cartridge 950 according to a ninth embodiment will be described with reference to FIGS. 18A through 19, wherein like parts and components are designated by the same reference numerals as those of the sixth embodiment illustrated in FIGS. 12A through 13 to avoid duplicating description.

Figure 18A:
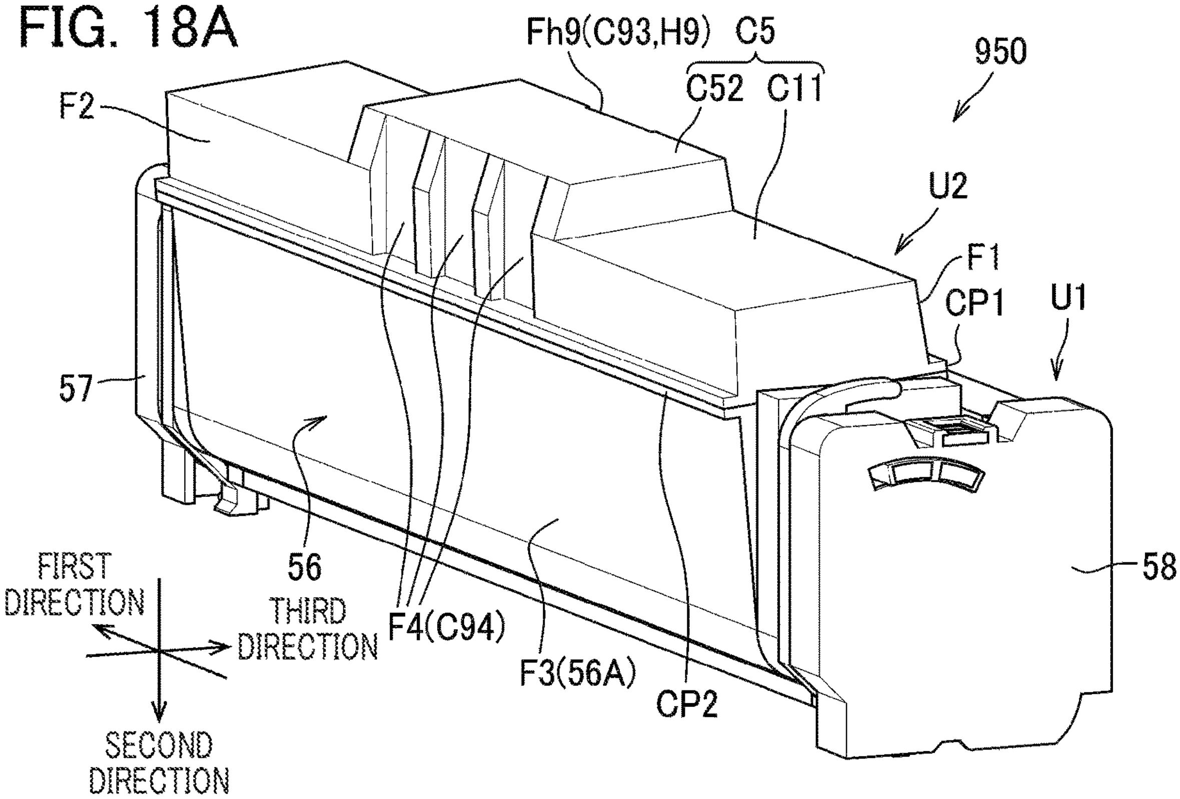
FIG. 18A is a perspective view of a process cartridge according to a ninth embodiment as viewed from the other side in the third direction.
Figure 18B:
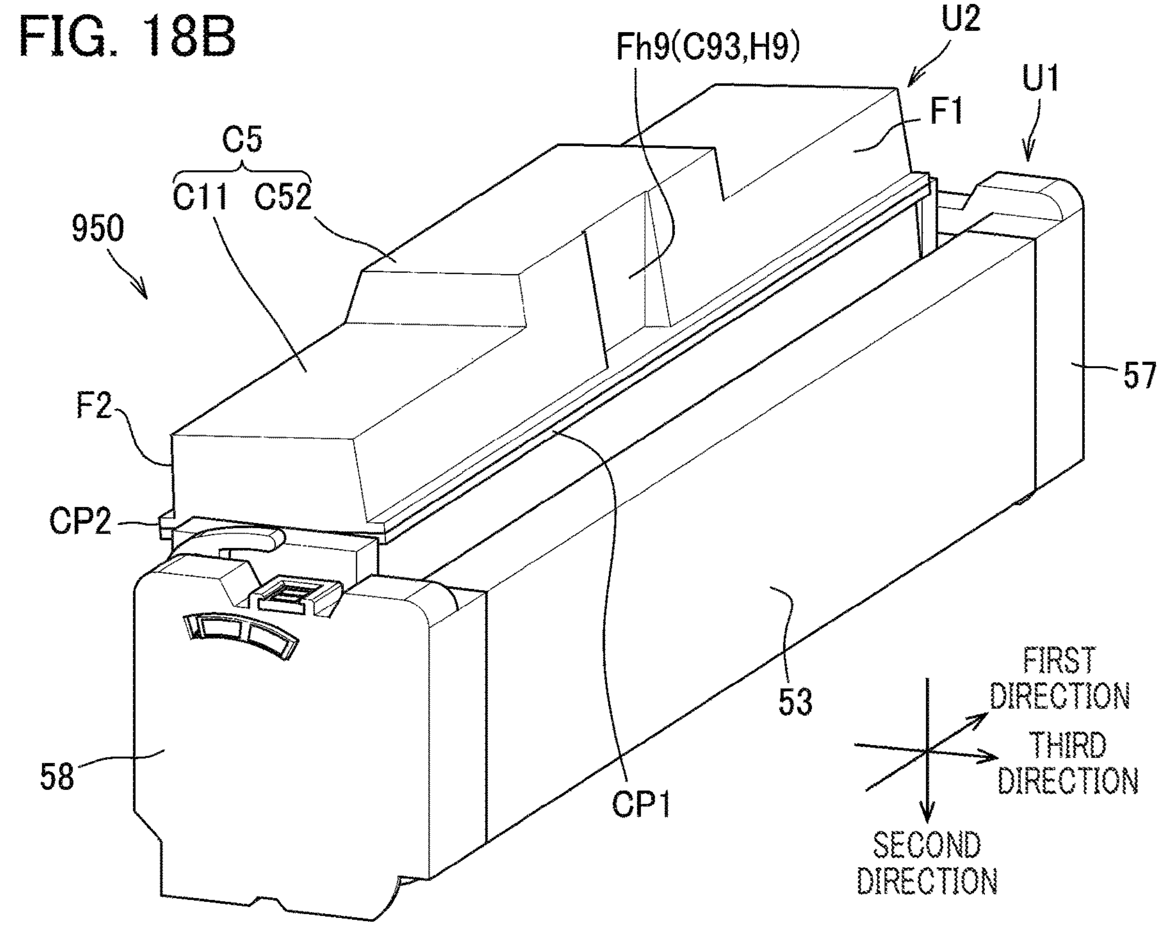
FIG. 18B is a perspective view of the process cartridge illustrated in FIG. 18A as viewed from the one side in the third direction.

As illustrated in FIGS. 18A and 18B, the process cartridge 950 according to the ninth embodiment includes a developing handle H9 which is different from the developing handle H6 of the sixth embodiment.

The developing handle H9 is positioned in the first surface F1. The developing handle H9 has a first recessed portion C93 whose shape is different from the shape of the first recessed portion C53 of the sixth embodiment.

Specifically, the first recessed portion C93 is recessed from the first surface F1 toward the other side in the third direction. The first recessed portion C93 is open both in the third direction toward the one side and in the second direction toward the other side. The first recessed portion C93 has an operation surface Fh9. The operation surface Fh9 is an inner surface of the first recessed portion C93 at the other side in the third direction. As illustrated in FIG. 19, the operation surface Fh9 is inclined relative to the second direction such that the operation surface Fh9 extends toward the one side in the third direction as extending toward the other side in the second direction. The operation surface Fh9 faces toward the one side in the second direction as well as toward the one side in the third direction.

As illustrated in FIGS. 18A and 18B, the process cartridge 950 according to the ninth embodiment also has three second recessed portions C94 which are different from the second recessed portions C54 of the sixth embodiment. Specifically, each second recessed portion C94 has a configuration substantially the same as that of the second recessed portion C54 except for an inclination angle of a bottom surface of each second recessed portion C94.

Specifically, each second recessed portion C94 has a fourth surface F4. The fourth surface F4 constitutes the bottom surface of the second recessed portion C94. The fourth surface F4 is recessed from the second surface F2 toward the one side in the third direction. The fourth surface F4 is positioned at the other end of the convex portion C5 at the other side in the third direction.

On the other hand, the developing casing 56 has a third surface F3. Specifically, the first developing casing 56A of the developing casing 56 has the third surface F3. The third surface F3 constitutes an end surface of the first developing casing 56A at the other side in the third direction. The third surface F3 is positioned on the one side of the fourth surface F4 in the second direction (downward in FIGS. 18A and 19).

Figure 19:
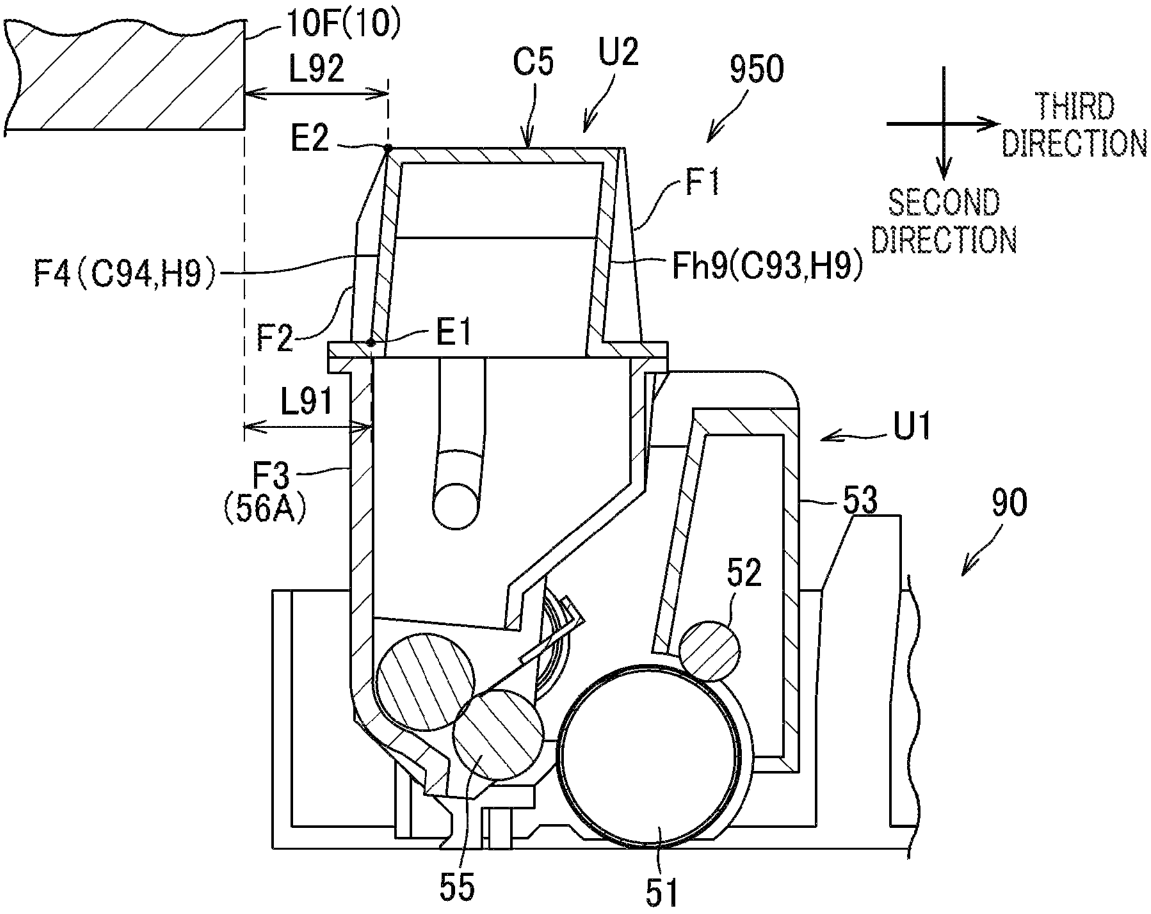
FIG. 19 is a cross-sectional view illustrating a positional relationship of the process cartridge illustrated in FIGS. 18A and 18B and the main housing of the image forming apparatus.

As illustrated in FIG. 19, the third surface F3 extends in parallel to the second direction when the process cartridge 950 is in the basic state. On the other hand, when the process cartridge 950 is in the basic state, the fourth surface F4 is inclined relative to the third surface F3 (and relative to the second direction) such that the fourth surface F4 extends toward the one side in the third direction (away from the third surface F3 in the third direction) as extending toward the other side in the second direction.

The fourth surface F4 has a first end E1 and a second end E2. The first end E1 is an end of the fourth surface F4 at the one side in the second direction. The second end E2 is an end of the fourth surface F4 at the other side in the second direction. The main housing 10 has an outer surface 10F that is positioned at one end of the main housing 10 at the one side in the third direction.

When the drawer 90 is at the outer position, a distance L92 in the third direction from the second end E2 to the outer surface 10F is greater than a distance L91 in the third direction from the first end E1 to the outer surface 10F, as illustrated in FIG. 19. With this structure of the ninth embodiment, a large gap can be provided in the third direction between the second end E2 of the fourth surface F4 and the outer surface 10F even in a case where the other end of the convex portion C5 at the other side in the third direction (i.e., a distal end of the process cartridge 950 at the other side in the third direction) is positioned near the outer surface 10F when the drawer 90 is at the outer position. Accordingly, a user can reliably insert his fingers in the gap between the outer surface 10F and the fourth surface F4.

Tenth Embodiment

Next, a process cartridge 1050 according to a tenth embodiment will be described with reference to FIGS. 20A through 21, wherein like parts and components are designated by the same reference numerals as those of the sixth embodiment illustrated in FIGS. 12A through 13 to avoid duplicating description.

Figure 20A:
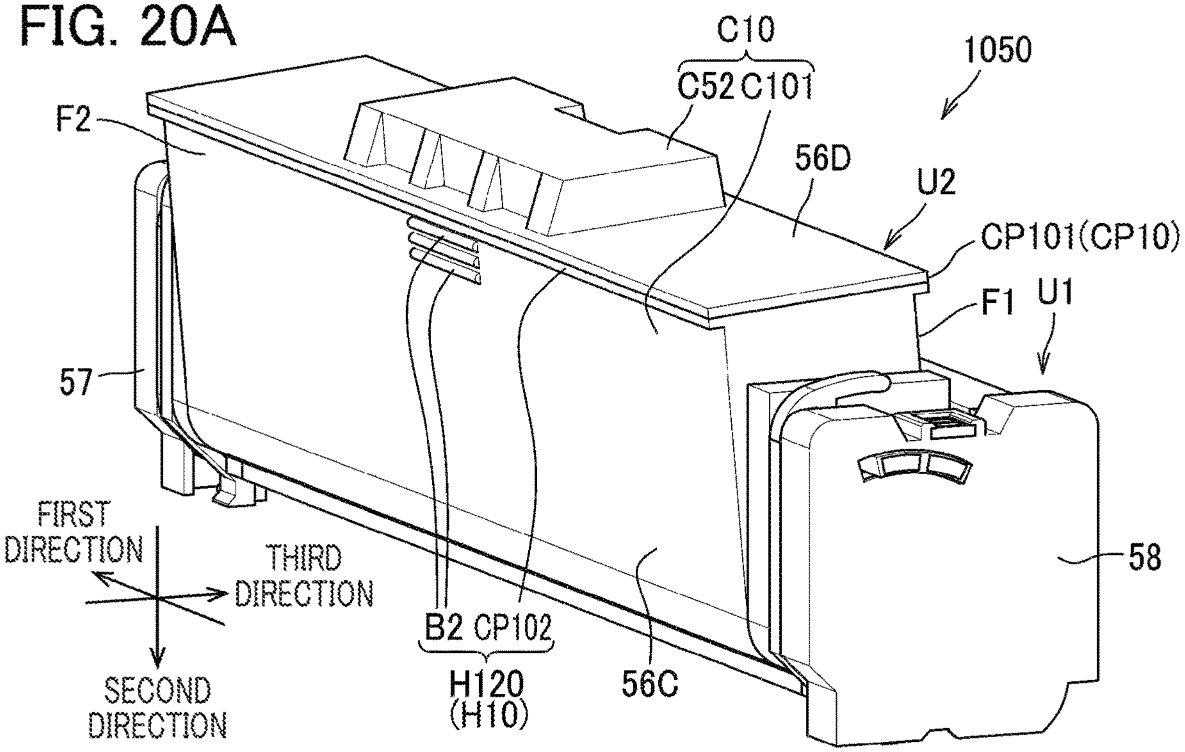
FIG. 20A is a perspective view of a process cartridge according to a tenth embodiment as viewed from the other side in the third direction.
Figure 20B:
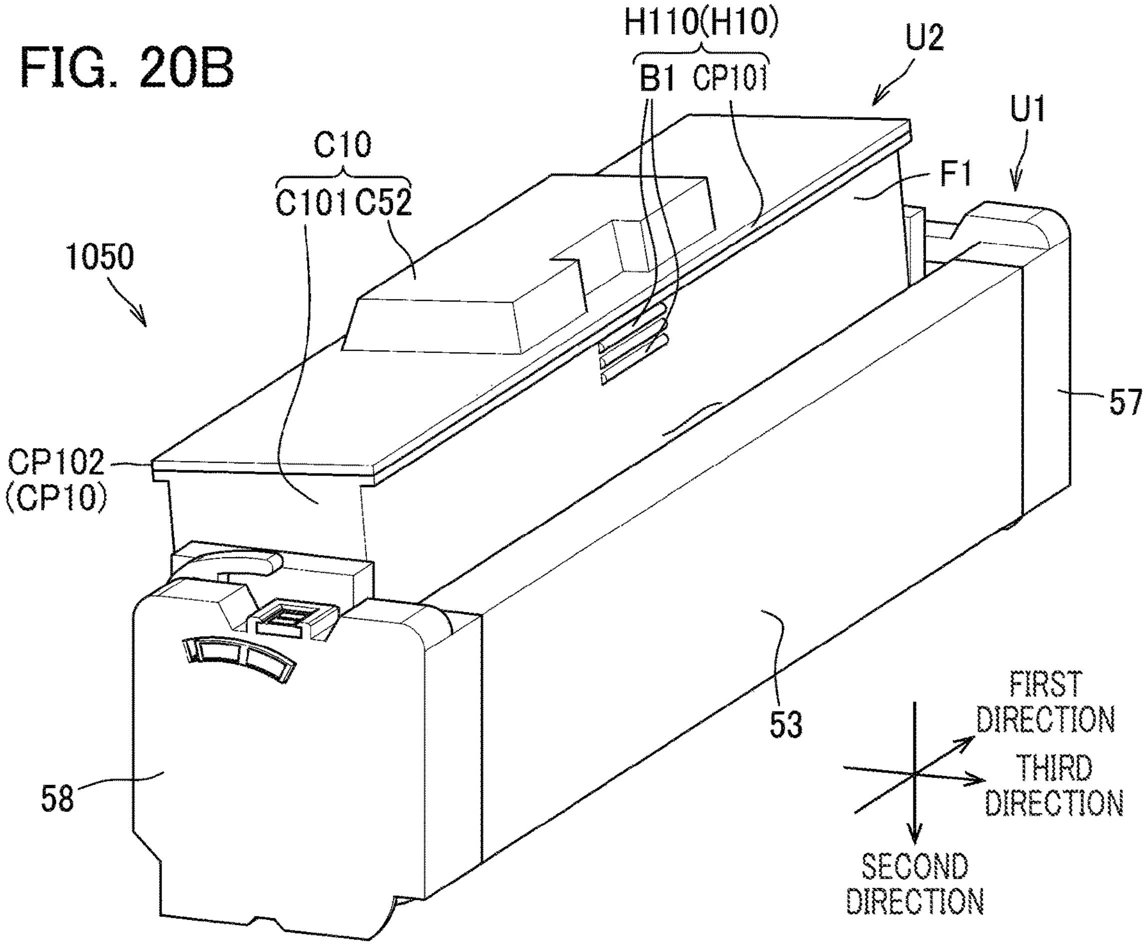
FIG. 20B is a perspective view of the process cartridge illustrated in FIG. 20A as viewed from the one side in the third direction.

As illustrated in FIGS. 20A and 20B, the process cartridge 1050 according to the tenth embodiment includes a developing handle H10 which is different from the developing handle H6 of the sixth embodiment.

Specifically, the process cartridge 1050 includes a first developing casing 56C and a second developing casing 56D joined to each other to provide a joining portion CP10 therebetween. The joining portion CP10 is configured of a first joining portion CP101 on the first surface F1, and a second joining portion CP102 on the second surface F2.

In the tenth embodiment, a part of the first developing casing 56C and the second developing casing 56D constitute a convex portion C10 of the process cartridge 1050. The convex portion C10 includes a first part C101 and the second part C52. The joining portion CP10 constitutes an end of the first part C101 at the other side in the second direction.

The developing handle H10 of the tenth embodiment includes a first developing handle H110 and a second developing handle H120.

The first developing handle H110 is configured of: a part of the first joining portion CP101; and a plurality of protrusions B1.

The first joining portion CP101 is positioned on the first surface F1. The first joining portion CP101 protrudes from the first surface F1 toward the one side in the third direction.

The protrusions B1 are positioned on a center portion of the first surface F1 in the first direction. The protrusions B1 protrude from the first surface F1 toward the one side in the third direction. The protrusions B1 are arrayed in line at intervals in the second direction. The protrusions B1 are positioned on the one side of the first joining portion CP101 in the second direction.

The second developing handle H120 is configured of a part of the second joining portion CP102, and a plurality of protrusions B2.

The second developing handle H120 has a structure symmetric with the structure of the first developing handle H110 in the third direction, and, hence, the second developing handle H120 will not be described here to avoid duplicating description.

Figure 21:
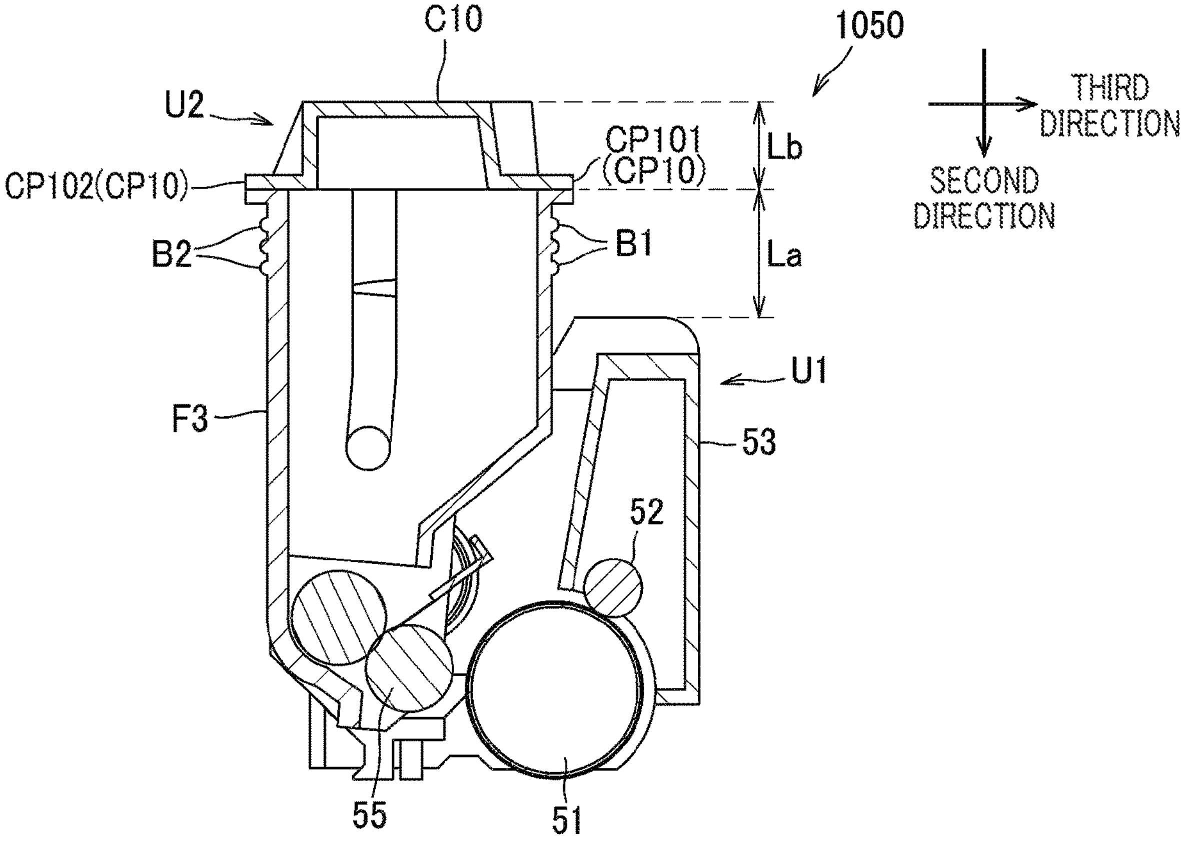
FIG. 21 is a cross-sectional view of the process cartridge illustrated in FIGS. 20A and 20B.

As illustrated in FIG. 21, a distance La in the second direction from the other end of the drum unit U1 in the second direction to the joining portion CP10 is greater than a distance Lb in the second direction from the joining portion CP10 to an end of the convex portion C10 at the other side in the second direction.

This configuration of the tenth embodiment can exhibit technical advantages similar to those of the sixth embodiment.

VARIATIONS AND MODIFICATIONS

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

The recessed portion of the disclosure may be recessed in any direction crossing the second direction. For example, the recessed portion may be recessed in the first direction.

Further, parts and components described in the various embodiments may be suitably selected and combined together as long as the combination does not provide technically conflicting problems.

Remarks

The image forming apparatus 1 is an example of an image forming apparatus of the disclosure. The main housing 10 is an example of a main housing of the disclosure. The drawer 90 is an example of a drawer of the disclosure. The process cartridges 50, 250, 350, 450, 550, 650, 750, 850, 950, 1050 are examples of a process cartridge of the disclosure. The drum unit U1 is an example of a drum unit of the disclosure. The developing unit U2 is an example of a developing unit of the disclosure. The drum housing 53 is an example of a drum housing of the drum unit. The photosensitive drum 51 is an example of a photosensitive drum of the drum unit. The developing casing 56 is an example of a developing casing of the developing unit. The convex portions C1, C5, C8, C10 are examples of a convex portion of the developing casing. The developing roller 55 is an example of a developing roller of the developing unit. The developing handles H1, H2, H3, H4, H5, H6, H7, H8, H9, H10 are examples of a developing handle of the developing unit. The recessed portions 110, 210, 131, 132, 171, 172, C93, C94 are examples of a recessed portion of the developing handle. The operation surfaces Fh, Fh2, Fh3, Fh5, Fhb, Fh7, Fh9 are examples of an operation surface of the recessed portion. The first part C11, C81, C101 are examples of a first part of the convex portion. The second parts C12, C52, C82 are examples of a second part of the convex portion. The first surface F1 is an example of a first surface of the convex portion. The second surface F2 is an example of a second surface of the convex portion. The third surface F3 is an example of an opposing surface of the developing casing. The fourth surface F4 is an example of a particular surface of the convex portion. The protrusions H53, H54, H61, B1, B2 are examples of a plurality of protrusions of the developing handle.

What is claimed is:

1. An image forming apparatus comprising:
- a main housing;
- a drawer movable relative to the main housing; and
- a process cartridge attachable to the drawer, the process cartridge being in a basic state without application of an external force thereto and being configured to temporarily shift from the basic state to a contacting state upon receipt of the external force, the process cartridge comprising:
  - a drum unit comprising:
    - a drum housing; and
    - a photosensitive drum rotatable about a first axis extending in a first direction, the photosensitive drum being positioned at one end portion of the drum housing at one side in a second direction;
  - a developing unit comprising:
    - a developing casing defining a toner accommodating chamber therein for accommodating toner, the developing casing including a convex portion positioned farther away from the drawer toward another side in the second direction than the drum unit is from the drawer toward the another side in the second direction in a state where the process cartridge is attached to the drawer;
    - a developing roller rotatable about a second axis extending in the first direction, the developing roller being positioned at one end portion of the developing casing at the one side in the second direction, the developing roller being separated from the photosensitive drum while the process cartridge is in the basic state, the developing roller being in contact with the photosensitive drum while the process cartridge is in the contacting state; and
    - a developing handle for detaching the process cartridge in the basic state from the drawer toward the another side in the second direction, the developing handle being positioned apart from the drum unit toward the another side in the second direction;

a locking member supported by the developing casing and configured to contact the drum housing, the locking member being movable between a locking position and an unlocking position, the locking member at the locking position being in contact with the drum housing to maintain the developing roller separated from the photosensitive drum, the locking member at the unlocking position allowing the developing roller to contact the photosensitive drum; and a lever configured to move the locking member between the locking position and the unlocking position, wherein while the process cartridge is in the basic state, the locking member is at the locking position to maintain the developing roller separated from the photosensitive drum, and the convex portion protrudes further toward the another side in the second direction than the lever.

2. The image forming apparatus according to claim 1, wherein the drum unit has an end at the another side in the second direction, wherein the convex portion has an end at the another side in the second direction, and wherein a distance in the second direction from the end of the drum unit at the another side in the second direction to the developing handle is greater than a distance in the second direction from the developing handle to the end of the convex portion at the another side in the second direction.

3. The image forming apparatus according to claim 1, wherein the convex portion comprises:

a first part; and a second part protruding toward the another side in the second direction from a center portion of the first part in the first direction, and wherein the developing handle is positioned at the second part.

4. The image forming apparatus according to claim 1, wherein the convex portion comprises:

a first part; and a second part protruding toward the another side in the second direction from a center portion of the first part in the first direction, and wherein the developing handle is positioned at the first part.

5. The image forming apparatus according to claim 1, wherein the developing handle comprises:

a first developing handle positioned at one end portion of the convex portion at one side in a third direction crossing the first direction and the second direction; and a second developing handle positioned at another end portion of the convex portion at another side in the third direction.

6. The image forming apparatus according to claim 5, wherein the third direction is perpendicular to both the first direction and the second direction.

7. The image forming apparatus according to claim 1, wherein the developing handle has a recessed portion that is recessed in a direction crossing the second direction, the recessed portion having an operation surface crossing the second direction and facing toward the one side in the second direction.

8. The image forming apparatus according to claim 7, wherein the recessed portion is open toward the another side in the second direction.

9. The image forming apparatus according to claim 7, wherein the drum housing is positioned on one side of the developing casing in a third direction crossing the first direction and the second direction, wherein the convex portion has a first surface at the one side in the third direction and a second surface at another side in the third direction, wherein the recessed portion is recessed from the first surface toward the another side in the third direction, the recessed portion being defined by five inner surfaces, and wherein the operation surface is one of the inner surfaces of the recessed portion that is positioned at the another side in the second direction.

10. The image forming apparatus according to claim 7, wherein the recessed portion is recessed in a third direction crossing the first direction and the second direction, and wherein the recessed portion has a dimension in the third direction that is equal to or greater than one half of a dimension in the third direction of the convex portion.

11. The image forming apparatus according to claim 7, wherein the developing handle has a plurality of the recessed portions arrayed at intervals in the first direction.

12. The image forming apparatus according to claim 7, wherein the convex portion has a first surface at one side in a third direction and a second surface positioned at another side in the third direction, the third direction crossing the first direction and the second direction, wherein the developing handle has a plurality of the recessed portions including a first recessed portion and a plurality of second recessed portions arrayed at intervals in the first direction, wherein the first recessed portion is positioned at one of the first surface and the second surface, and wherein the plurality of second recessed portions is positioned at a remaining one of the first surface and the second surface.

13. The image forming apparatus according to claim 7, wherein the recessed portion is provided at the convex portion and protrudes further toward the another side in the second direction than the lever.

14. The image forming apparatus according to claim 1, wherein the developing handle has a protrusion protruding in a third direction crossing the first direction and the second direction.

15. The image forming apparatus according to claim 14, wherein the developing handle has a plurality of the protrusions each protruding in the third direction, the plurality of the protrusions being arrayed at intervals in the second direction.

16. The image forming apparatus according to claim 14, wherein the convex portion has a first surface at one side in the third direction crossing the first direction and the second direction, the protrusion protruding from the first surface, and wherein at least a part of the protrusion has a friction coefficient higher than a friction coefficient of the first surface.

17. The image forming apparatus according to claim 14, wherein the convex portion has:

a first surface at one side in the third direction crossing the first direction and the second direction; and a recessed portion recessed in the third direction from the first surface, and wherein the protrusion is positioned in the recessed portion.

18. The image forming apparatus according to claim 1, wherein the drum unit further comprises a drum handle to allow a user to hook his fingers therewith from the one side in the second direction.

19. The image forming apparatus according to claim 18, wherein the drum housing is positioned on one side of the developing casing in a third direction crossing the first direction and the second direction, wherein the convex portion has a first surface at the one side in the third direction and a second surface at another side in the third direction, and wherein the developing handle is positioned at the second surface.

20. The image forming apparatus according to claim 1, wherein the developing casing has one surface at one side in a third direction crossing the first direction and the second direction and an opposing surface at another side in the third direction, wherein the convex portion has a particular surface at the another side in the third direction, the particular surface being positioned on the another side of the opposing surface in the second direction, and wherein the particular surface is inclined relative to the opposing surface such that the particular surface extends toward the one side in the third direction away from the opposing surface as extending toward the another side in the second direction.

21. The image forming apparatus according to claim 1, wherein the developing casing comprises:

a first developing casing supporting the developing roller; and a second developing casing joined to the first developing casing to provide a joining portion therebetween, and wherein the developing handle includes the joining portion.

22. The image forming apparatus according to claim 1, wherein the developing handle is pivotally movable between a first position and a second position relative to the developing casing, wherein the developing handle protrudes further toward the another side in the second direction relative to the convex portion at the second position, and wherein the developing handle does not protrude further toward the another side in the second direction relative to the convex portion at the first position.

23. The image forming apparatus according to claim 22, wherein the drawer is movable between an inner position where the drawer is attached to the main housing and an outer position where the drawer is drawn out of the main housing, and wherein the developing handle is configured to abut on the main housing to be pivotally moved from the second position to the first position during movement of the drawer from the outer position toward the inner position in a state where the process cartridge is attached to the drawer and the developing handle is at the second position.

24. The image forming apparatus according to claim 22, wherein the convex portion comprises:

a first part; and a second part protruding toward the another side in the second direction from a center portion of the first part in the first direction, and wherein the developing handle is positioned at the second part.

25. The image forming apparatus according to claim 1, wherein the first direction is perpendicular to the second direction.

26. The image forming apparatus according to claim 1, wherein the lever is movable in the second direction between a first lever position and a second lever position, the second lever position being further toward the one side in the second direction than the first lever position, wherein the lever is at the first lever position while the process cartridge is in the basic state, wherein the lever is at the second lever position while the drawer is accommodated in the main housing with the process cartridge attached to the drawer, and wherein the locking member is maintained at the locking position regardless of whether the lever is at the first lever position or at the second lever position.

27. The image forming apparatus according to claim 26, wherein the lever is pivotable to a third lever position from the second lever position while the drawer is accommodated in the main housing with the process cartridge attached to the drawer, and wherein the locking member moves from the locking position to the unlocking position in response to pivotal movement of the lever from the second lever position to the third lever position.

* * * * *